(12) United States Patent
Yamaguchi et al.

(10) Patent No.: US 7,989,529 B2
(45) Date of Patent: Aug. 2, 2011

(54) THERMOSENSITIVE ADHESIVE COMPOSITION, METHOD OF MANUFACTURING THE SAME AND THERMOSENSITIVE ADHESIVE MATERIAL

(75) Inventors: Takehito Yamaguchi, Numazu (JP); Hiroaki Matsui, Numazu (JP); Mitsunobu Morita, Numazu (JP); Takayuki Sasaki, Mishima (JP); Kunio Hayakawa, Mishima (JP)

(73) Assignee: Ricoh Company, Ltd., Tokyo (JP)

( * ) Notice: Subject to any disclaimer, the term of this patent is extended or adjusted under 35 U.S.C. 154(b) by 1080 days.

(21) Appl. No.: 11/598,132

(22) Filed: Nov. 10, 2006

(65) Prior Publication Data

US 2007/0112113 A1 May 17, 2007

(30) Foreign Application Priority Data

Nov. 17, 2005 (JP) .................. 2005-333095

(51) Int. Cl.
*B60C 1/00* (2006.01)
*C08K 5/00* (2006.01)

(52) U.S. Cl. ........ 524/287; 524/242; 524/567; 503/200; 428/32.1; 428/32.51; 428/195.1

(58) Field of Classification Search .................. 428/32.1, 428/32.51, 195.1, 343, 346, 347, 355 R, 355 AC, 428/355 N, 913; 503/200; 524/242, 287, 524/567

See application file for complete search history.

(56) References Cited

U.S. PATENT DOCUMENTS

| | | | |
|---|---|---|---|
| 2004/0265573 | A1 | 12/2004 | Morita et al. |
| 2005/0088508 | A1* | 4/2005 | Iwasaki et al. ............... 347/213 |
| 2006/0068191 | A1 | 3/2006 | Goto et al. |

FOREIGN PATENT DOCUMENTS

| | | |
|---|---|---|
| EP | 1 466 751 A1 | 10/2004 |
| EP | 1 466 752 A1 | 10/2004 |
| EP | 1 479 743 A1 | 11/2004 |
| JP | 06-172725 | 6/1994 |
| JP | 07-003239 | 1/1995 |
| JP | 2002-038123 | 2/2002 |
| JP | 2002-097444 | 4/2002 |
| JP | 2002-105414 | 4/2002 |
| JP | 2002-121532 | 4/2002 |
| JP | 2002-121533 | 4/2002 |
| JP | 2002-173662 | 6/2002 |
| JP | 2002-265896 | 9/2002 |
| JP | 2003-096408 | 4/2003 |
| JP | 2003-206455 | 7/2003 |
| JP | 2003-216047 | 7/2003 |
| JP | 3556414 | 5/2004 |

OTHER PUBLICATIONS

P. Bowen, "Particle Size Distribution Measurement from Millimeters to Nanometers and from Rods to Platelets," J. Dispersion Sci. and Tech., vol. 23, No. 5, 2002, pp. 631-662.
European Patent Office, Communication pursuant to Art. 94(3) EPC (Aug. 25, 2009), Application No. EP 06 023 901.9-2102 (Ricoh Company, Ltd.).
European Patent Office, extended European search report dated Feb. 19, 2007 in European Patent Appln. No. 06023901.9-2102 Ricoh Company, Ltd.
European Patent Office, Communication pursuant to Article 94(3) EPC (Oct. 6, 2010), Application No. 06 023 901.9-2102 (Ricoh Company, Ltd.).

* cited by examiner

*Primary Examiner* — Mark Ruthkosky
*Assistant Examiner* — David J Joy
(74) *Attorney, Agent, or Firm* — Cooper & Dunham LLP

(57) ABSTRACT

A thermosensitive adhesive composition including a thermosensitive plastic resin, a dispersing agent, a solid plasticizing agent and a eutectic agent represented by the following chemical structure (1):

Chemical structure (1)

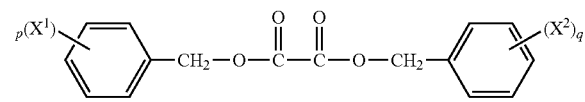

wherein $X^1$ and $X^2$ independently represent any one of a hydrogen atom, a halogen atom and an alkyl group, p and q independently represent an integer of from 1 to 5.

19 Claims, No Drawings

THERMOSENSITIVE ADHESIVE COMPOSITION, METHOD OF MANUFACTURING THE SAME AND THERMOSENSITIVE ADHESIVE MATERIAL

BACKGROUND OF THE INVENTION

1. Field of the Invention

The present invention relates to a thermosensitive adhesive composition which is not adhesive at room temperature but becomes adhesive upon application of heat and continues to be adhesive and especially has a sufficient adhesibility to a rough surface adherend, for example, a corrugated board, and a corresponding manufacturing method and a corresponding thermosensitive adhesive material.

2. Discussion of the Background

As adhesive sheets, for example, adhesive labels, seals and stick-ons, typical examples are: (1) a material in which an adhesive agent is applied to release paper and the resultant is attached to a substrate (for example, quality paper, art paper, polyethylene terephthalate (PET) and (2) a material in which an adhesive agent is directly applied to a substrate, release paper is laminated and seal printing is performed. In such adhesive sheets, release paper is required to protect the adhesive agent layer. When release paper is not used, a special coating treatment is necessary for the adhesive agent layer.

Delayed tack type adhesive sheets have appeared in place of such adhesive sheets. Since an adhesive agent for use in this delayed tack type adhesive sheet is not adhesive at room temperature and can be directly applied to an adherend (substrate), release paper, etc., are not required. When compared with typical adhesive sheets, the delayed tack type adhesive sheet is cost-reductive and resource-saving. Consequently, the demand on the delayed tack type adhesive sheet is rapidly increasing in the package material field and other various kinds of fields.

In general, in the adhesive agents for use in the delayed tack type adhesive sheet mentioned above, an adhesiveness imparting agent for imparting the adhesibility to various kinds of substrates is added in a thermoplastic resin and, in addition, a solid plasticizing agent is also added therein. When this kind of the adhesive agent for use in the delayed tack type sheet is heated, the solid plasticizing agent is melted first. Next, the thermoplastic resin and the adhesive imparting agent are dissolved in each other in the melted solid plastic agent functioning as a solvent. This is considered to be the way the adhesibility appears.

However, in the case of the delayed tack type adhesive agent mentioned above, a phenomenon referred to as "blocking" easily occurs in which the delayed tack type adhesive agent is adhesive even when the delayed tack type adhesive agent is not heated (for example, preserved at ambient temperature, for example, 22° C.), which leads to attachment of adhesive layers to each other. This causes a problem when the sheets are labeled.

This "blocking" occurring in the case of such a delayed tack type adhesive agent can be improved to a certain degree when a solid plasticizing agent having a high melting point is used. For example, in published unexamined Japanese patent applications Nos. (hereinafter referred to as JOP) 2003-206455 and 2002-38123, a delayed tack type adhesive agent in which benzophenone is used as a solid plasticizing agent is described. This adhesive agent has adhesibility to a mirror surface, for example, polyolefin and glass, but has weak adhesibility to a rough surface adherend, for example, a corrugated board. When the adhesive agent is attached to a corrugated board, the adhesibility decreases overtime, which creates a great problem when used in logistics, for example, home-delivery service. Furthermore, there is another problem that "blocking" occurs in an environment at 60° C.

In addition, in JOP 2002-105414, a thermosensitive adhesive material is described which contains a hindered phenol compound, a benzotriazole compound, and an aromatic sulfonic amide compound and furthermore, hollow particles having a hollow ratio of 50% in an undercoating layer. However, even when the thermosensitive adhesive material described therein is used, the adhesibility and blocking property are not sufficiently satisfactory for a rough surface adherend, for example, a corrugated board.

In addition, in Japanese patent No. (hereinafter referred to as JP) 3556414, a delayed tack glue is described in which benzotriazole is used as a solid plasticizing agent. The delayed tack glue described therein has a relatively excellent anti-blocking property and can stably sustain the adhesibility over an extended period of time for an adherend formed of, for example, materials such as paper, glass and metal and polyolefin resins such as polypropylene and polyethylene. However, even in the case of the delayed tack glue, the adhesibility for a rough surface adherend, for example, a corrugated board, is weak. Therefore, when the delayed tack glue is attached to a corrugated board, the adhesibility deteriorates over time. Especially, the adhesibility thereof is insufficient in a low temperature environment of not higher than 5° C.

To solve these problems, as a method of improving the adhesibility at a low temperature, for example, combining a liquid plasticizing agent having a low molecular weight is described in JOP 2002-121532. However, this proposal involves a problem in that the liquid plasticizing agent having a low molecular weight transfers to the surface over time, which easily causes blocking.

In addition, as a method of improving anti-blocking property, for example, JOPs H07-3239, 2002-97444, 2002-121533 and H06-172725 describe methods in which a liquid plasticizing agent having a low molecular weight is encapsulated in a microcapsule. However, in these methods, the wall material of the microcapsule has adhesion inhibition after thermal activation, which leads to a problem in that a sufficient adhesibility is not obtained.

In addition, JOP 2003-216047 describes a method in which the adhesibility of an applied material is improved by delaying the recrystallization of the solid plasticizing agent by an application of a liquefied softening agent before and/or after the thermal activation. However, in this method, it is necessary to apply a liquefied softening agent having a low molecular weight, which causes a problem of practical use of the delayed tack agent.

In addition, JOPs 2002-173662, 2003-96408 and 2002-265896 describe a thermosensitive adhesive material having an excellent adhesibility at a low temperature environment. According to these teachings, the adhesibility at a low temperature is improved for a glass surface, for example, polyolefin based resin film wrap. However, there is a problem that the adhesibility at a low temperature for a rough surface adherend, for example, a corrugated board, is not sufficient.

Therefore, a thermosensitive adhesive composition and a thermosensitive adhesive material have not been provided yet which have a sufficient adhesibility to a rough surface adherend, for example, a corrugated board, in an environment of from a low temperature (0° C.) to room temperature (25° C.) and have both an anti-blocking property and an adhesibility by which peeling-off can be prevented for an extended period of time. Currently, prompt provision thereof has been desired.

SUMMARY OF THE INVENTION

Because of these reasons, the present inventors recognize that a need exists for a thermosensitive adhesive composition having a sufficient adhesibility to a rough surface adherend, for example, a corrugated board, in an environment of from a low temperature (0° C.) to room temperature (25° C.) and having both an anti-blocking property and an adhesibility by which peeling-off can be prevented for an extended period of time, a method of manufacturing it and a thermosensitive adhesive material including it.

Accordingly, an object of the present invention is to provide a thermosensitive adhesive composition having a sufficient adhesibility to a rough surface adherend, for example, a corrugated board, in an environment of from a low temperature (0° C.) to room temperature (25° C.) and having both an anti-blocking property and an adhesibility by which peeling-off can be prevented for an extended period of time, a method of manufacturing it and a thermosensitive adhesive material including it.

Briefly these objects and other objects of the present invention as hereinafter described will become more readily apparent and can be attained, either individually or in combination thereof, by a thermosensitive adhesive composition containing a thermosensitive plastic resin, a dispersing agent, a solid plasticizing agent and a eutectic agent represented by the following chemical structure (1):

Chemical structure (1)

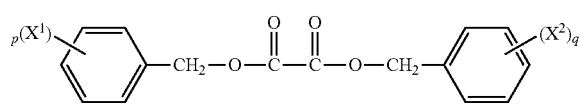

wherein $X^1$ and $X^2$ independently represent any one of a hydrogen atom, a halogen atom and an alkyl group, p and q independently represent an integer of from 1 to 5.

It is preferred that, in the thermosensitive adhesive composition mentioned above, the eutectic agent represented by the chemical structure (1) is a dibenzyl ester of oxalic acid represented by the following chemical structure (1-1):

Chemical structure (1-1)

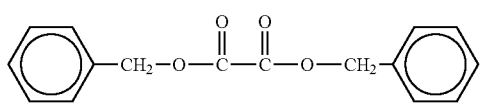

It is also preferred that, in the thermosensitive adhesive composition mentioned above, the eutectic agent represented by the chemical structure (1) is a di-p-methylbenzyl ester of oxalic acid represented by the following chemical structure (1-2):

Chemical structure (1-2)

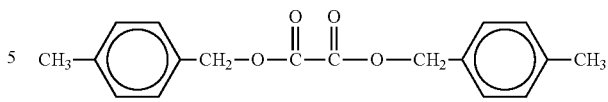

It is still further preferred that, in the thermosensitive adhesive composition mentioned above, the content of the eutectic agent is from 20 to 40 parts by weight based on 100 parts by weight of the solid plasticizing agent.

It is still further preferred that, in the thermosensitive adhesive composition mentioned above, the volume average particle diameter of the eutectic agent is not greater than 2.0 μm.

It is still further preferred that, in the thermosensitive adhesive composition mentioned above, the solid plasticizing agent is at least one compound selected from the group consisting of benzotriazole compounds and triphenylphosphine compounds.

It is still further preferred that, in the thermosensitive adhesive composition mentioned above, the volume average particle diameter of the solid plasticizing agent is not greater than 2.0 μm.

It is still further preferred that, in the thermosensitive adhesive composition mentioned above, the dispersing agent is a polyvinyl alcohol resin having a sulphonic acid group.

It is still further preferred that the thermosensitive adhesive composition mentioned above further contains an adhesive imparting agent.

As another aspect of the present invention, a method of manufacturing the thermosensitive adhesive composition mentioned above is provided which includes preparing a liquid dispersion of the solid plasticizing agent by dispersing the solid plasticizing agent and the eutectic agent represented by the following chemical structure (1) with a polyvinyl alcohol resin comprising a sulfonic acid group in water such that each of volume average particle diameters is not greater than 2.0 μm:

Chemical structure (1)

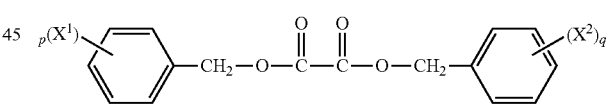

In the chemical structure (1) $X^1$ and $X^2$ independently represent any one of a hydrogen atom, a halogen atom and an alkyl group, p and q independently represent an integer of from 1 to 5.

As another aspect of the present invention, a thermosensitive adhesive material is provided which includes a substrate and a thermosensitive adhesive layer provided to a side of the substrate. The thermosensitive adhesive layer contains the thermosensitive adhesive composition mentioned above.

It is preferred that, in the thermosensitive adhesive material mentioned above, the adhesibility of the thermosensitive adhesive layer to an adhesion surface of an adherend is not less than 400 gf/40 mm when measured two minutes after the adhesion at an environment temperature of from 0 to 40° C.

It is still further preferred that, in the thermosensitive adhesive material mentioned above, the arithmetical mean surface roughness (Ra) of the adhesion surface of the adherend is not less than 0.3 μm.

It is still further preferred that the thermosensitive adhesive material mentioned above further includes an intermediate layer between the substrate and the thermosensitive adhesive layer. The intermediate layer includes hollow particles and a binder resin.

It is still further preferred that the thermosensitive adhesive material mentioned above further includes a recording layer which is provided on a side of the substrate opposite to the side on which the thermosensitive adhesive layer is provided.

It is still further preferred that, in the thermosensitive adhesive material mentioned above, the recording layer is one of a thermosensitive recording layer, an ink jet recording layer, an ink receptive layer for thermal transfer and an electrophotographic recording layer.

It is still further preferred that, in the thermosensitive adhesive material mentioned above, the thermosensitive recording layer contains a leuco dye and a coloring developing agent.

It is still further preferred that the thermosensitive adhesive material mentioned above has a form of one of a label, a sheet and a roll.

These and other objects, features and advantages of the present invention will become apparent upon consideration of the following description of the preferred embodiments of the present invention.

DETAILED DESCRIPTION OF THE INVENTION

The present invention will be described below in detail with reference to several embodiments.

Since the thermosensitive adhesive composition of the present invention contains at least a thermosensitive adhesive resin, a dispersing agent, a solid plasticizing agent and a eutectic agent represented by the chemical structure (1) illustrated below, it is possible for the thermosensitive adhesive composition to have a sufficient adhesibility for a typically difficult adherend, for example, a corrugated board, which has a rough surface, in an environment of from a low temperature (0° C.) to room temperature (25° C.), and have both an anti-blocking property and an adhesibility by which peeling-off can be prevented for an extended period.

Chemical structure (1)

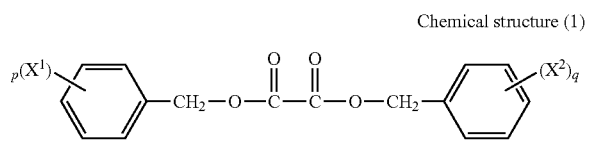

The method of manufacturing the thermosensitive adhesive composition of the present invention is a method of manufacturing the thermosensitive adhesive composition mentioned above of the present invention.

The method includes at least a preparation process of a liquid dispersion of the solid plasticizing agent in which a liquid dispersion of the solid plasticizing agent is prepared by dispersing the solid plasticizing agent and the eutectic agent represented by the chemical structure (1) illustrated above with a polyvinyl alcohol resin having a sulfonic acid group in water such that each of the volume average particle diameters is not greater than 2.0 μm.

In the method of manufacturing the thermosensitive adhesive composition of the present invention, the thermosensitive adhesive composition of the present invention can be efficiently and inexpensively manufactured.

The thermosensitive adhesive material of the present invention contains at least a substrate and a thermosensitive adhesive layer formed of the thermosensitive adhesive composition mentioned above of the present invention on a side of the substrate.

Since the thermosensitive adhesive composition mentioned above of the present invention is used in the thermosensitive adhesive material, the thermosensitive adhesive material has a sufficient adhesibility especially to a rough surface adherend, for example, a corrugated board, in an environment of from a low temperature (0° C.) to room temperature (25° C.), and have both an anti-blocking property and an adhesibility by which peeling-off can be prevented for an extended period of time.

Thermosensitive Adhesive Composition

The thermosensitive adhesive composition of the present invention contains at least a thermoplastic resin, a dispersing agent, a solid plasticizing agent, and a eutectic agent formed of a compound of a specific dibenzyl ester of oxalic acid and optionally an adhesiveness imparting agent, etc.

Eutectic Agent

As the eutectic agent mentioned above, the compound of a dibenzyl ester of oxalic acid represented by the following chemical structure (1) is used considering that the eutectic effect of the solid plasticizing agent mentioned above and the compatibility to the thermosensitive plastic resin are excellent.

Chemical structure (1)

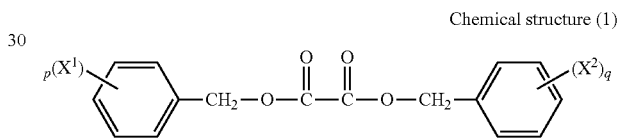

In the chemical structure (1) illustrated above, $X^1$ and $X^2$ independently represent any one of a hydrogen atom, a halogen atom and an alkyl group. p and q independently represent an integer of from 1 to 5.

Specific examples of the halogen atom mentioned above include fluorine atom, chlorine atom, bromine atom and iodine atom.

As the alkyl group mentioned above, an alkyl group having 1 to 10 carbon atoms is preferred. Specific examples thereof include methyl group, ethyl group, propyl group, butyl group, pentyl group and hexyl group.

As the compound of a dibenzyl ester of oxalic acid represented by the chemical structure (1) illustrated above, for example, the dibenzyl ester of oxalic acid represented by the following chemical structure (1-1), di-p-methylbenzyl ester of oxalic acid represented by the following chemical structure (1-2), di-p-ethylbenzyl ester of oxalic acid, and a di-p-chlorobenzyl ester of oxalic acid are specific examples.

Chemical structure (1-1)

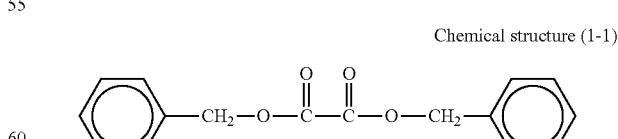

Chemical structure (1-2)

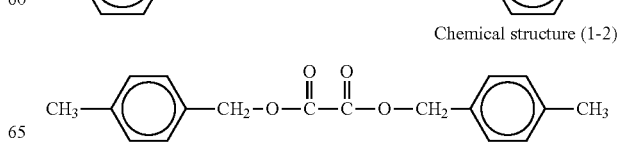

These can be used alone or in combination.

Among these, the dibenzyl ester of oxalic acid represented by the chemical structure (1-1) illustrated above and the di-p-methylbenzyl ester of oxalic acid represented by the chemical structure (1-2) illustrated above are especially preferred considering that the adhesibility to a corrugated board and polyethylene unwoven fabric (e.g., envelope) is high at a low temperature not higher than 5° C.

As to the eutectic agent mentioned above, the smaller the volume average particle diameter, the more preferred in terms of the low temperature adhesibility. However, there is a problem in that the smaller the particle diameter, the longer the dispersion time and the worse the dispersion stability. Therefore, the volume average particle diameter in the liquid dispersion of the eutectic agent mentioned above is preferably not greater than 2.0 μm, more preferably not greater than 1.0 μm and further preferably not greater than 0.5 μm. In this range, the adhesibility to a rough surface adherend, for example, a corrugated board, at a low temperature environment of not higher than 5° C. is extremely improved.

The volume average particle diameter of the eutectic agent mentioned above represents 50% volume average particle diameter. The volume average particle diameter can be measured by, for example, a laser diffraction/scattering method. Specifically, it is the volume average particle diameter corresponding to 50% of the cumulative distribution in a liquid dispersion (for example, water) measured by a laser diffraction/scattering particle size distribution measuring device ("LA-700", manufactured by Horiba Ltd.). A compound which is solid at room temperature and melted upon application of heat is suitably used as the eutectic agent. The melting point of the compound is preferably not lower than 70° C. and the upper limit thereof is preferably about 150° C. A melting point that is too low may cause a preservation problem (blocking) such that an obtained thermosensitive adhesive agent is adhesive at a temperature in the normal preservation environment and a problem in the manufacturing process such that the adhesibility appears when a liquid of application for a thermosensitive layer is applied to a substrate and dried. On the other hand, a melting point that is too high may cause the eutectic agent to lose the eutectic effect for a solid plasticizing agent.

The content of the eutectic agent mentioned above is preferably from 20 to 40 parts by weight and more preferably from 25 to 30 parts by weight based on 100 parts by weight of the solid plasticizing agent. A content that is too small weakens the adhesibility at a low temperature. In addition, when activated by a thermal head, the thermal activation may be slow in response and head debris tends to be produced. A content that is too large may shorten the time during which the adhesibility is sustained after a heat sources is removed. That is, the delaying property deteriorates.

Solid Plasticizing Agent

The solid plasticizing agent mentioned above is solid at room temperature and therefore does not impart plasticizing property to a resin. When heated and melted, the solid plasticizing agent swells and softens the resin, resulting in appearance of adhesibility. After the solid plasticizing agent is thermally melted, the crystallization slowly occurs. Therefore, after the heat source is removed, the adhesibility can be sustained for an extended period of time.

There is no specific limit to the solid plasticizing agent mentioned above and the solid plasticizing agent can be suitably selected according to purpose. Specific examples thereof include benzotriazole compounds, triphenyl phosphine compounds, esters of phthalic acid, hindered phenol compounds, polyester compounds of aromatic polyols and organic acids and other solid plasticizing agents.

Among these, the benzotriazole compound represented by the following chemical structure (2) and triphenyl phosphine compounds represented by the following chemical structure (3) are particularly preferred.

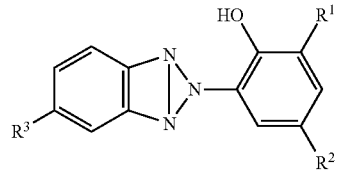

Chemical structure (2)

In the chemical structure (2) illustrated above, $R^1$ and $R^2$ independently represent one of a hydrogen atom, an alkyl group, and α, α-dimethylbenzyl group. $R^3$ represents either of a hydrogen atom or a halogen atom.

The alkyl group of $R^1$ and $R^2$ is preferred to be a group having 1 to 8 carbon atoms. Specific examples thereof include methyl group, ethyl group, n-propyl group, n-butyl group, n-pentyl group, n-hexyl group, and n-heptyl group. These can be further substituted by a substitutional group.

Specific examples of the substitutional group mentioned above include hydroxyl group, a halogen atom, nitro group, carboxyl group and cyano group. In addition, an alkyl group, an aryl group, a heterocyclic group, which can have a specific substitutional group (for example, it is possible to be further substituted by a halogen atom or nitro group) are also included.

Specific examples of the halogen atom of $R^3$ include fluorine atom, chlorine atom, bromine atom and iodine atom.

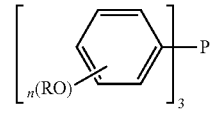

Chemical structure (3)

In the chemical structure (3), R represents hydrogen atom or an alkyl group. n represents an integer of from 1 to 5.

The alkyl group of R is preferably a group having 1 to 8 carbon atoms. Specific examples thereof include methyl group, ethyl group, propyl group, butyl group, pentyl group and hexyl group.

As the benzotriazole compound represented by the chemical structure (2), specific examples thereof include
2-(3-t-butyl-2-hydroxy-5-methylphenyl)-5-chlorobenzo triazole,
2-(3,5-di-t-pentyl-2-hydroxyphenyl)-2H-benzotriazole,
2-(2-hydroxy-5-t-octylphenyl)-2H-benzotriazole,
5-chloro-2-(3,5-di-t-butyl-2-hydroxyphenyl)-2H-benzotriazole,
2-[2-hydroxy-3,5-bis(α,α-dimethylbenzyl)phenyl]-2H-benzotriazole, and
2-(2'-hydroxy-3'-t-butyl-5'-methylphenyl)-5-chlorobenzo triazole. These can be used alone or in combination.

Specific examples of the triphenylphosphine compound represented by the structure (3) include
tris(o-methoxyphenyl)phosphine, tris(m-methoxyphenyl) phosphine, tris(p-methoxyphenyl)phosphine, tris(p-ethoxyphenyl)phosphine,
tris(p-propyloxyphenyl)phosphine,
tris(o-t-butoxyphenyl)phosphine,
tris(o-butoxyphenyl)phosphine,
tris(p-butoxyphenyl)phosphine,
tris(p-t-butoxyphenyl)phosphine, and
tris(m-t-butoxyphenyl)phosphine. These can be used alone or in combination.

As the compounds represented by either of the chemical structures (2) and (3) illustrated above, compounds which are solid at room temperature and fused upon application of heat are used. The melting point of these compounds is preferably not lower than 70° C. and more preferably not lower than 80° C. The upper limit of the melting point of the compounds mentioned above is about 200° C. A melting point that is too low may cause a preservation problem such that an obtained thermosensitive adhesive agent is adhesive at a temperature in the normal preservation environment and a problem in the manufacturing process such that the adhesibility appears when a liquid of application for thermosensitive layer is applied to a substrate and dried. On the other hand, a melting point that is too high, requires a massive amount of energy to make the adhesibility appear, which causes a practical problem. In addition, when thermosensitive recording paper is used as a substrate and the adhesibility is made to appear with a massive amount of energy, the thermosensitive recording layer may be colored, which may make the printed image hard to read.

In addition, when at least two kinds of the compounds represented by either of the structures (2) or (3) illustrated above are mixed and used as the solid plasticizing agent, thermoactive energy can be reduced (improvement on sensitivity). The effect is heightened especially when at least two kinds of solid plasticizing agents having a similar structure are used. There is also a merit in that the delaying property is improved.

The volume average particle diameter of the solid plasticizing agent is preferably not greater than 2.0 μm, more preferably not greater than 1.2 μm, further preferably not greater than 1.0 μm and particularly preferably not greater than 0.5 μm. In this range, the solid plasticizing agent increases its dynamic thermoactive sensitivity and is compatible with the thermoplastic resin and the adhesiveness imparting agent with a small amount of energy to become a thermosensitive adhesive agent. In addition, the preservability at a temperature in a normal preservation environment can be improved (i.e., anti-blocking property is improved).

The volume average particle diameter of the solid plasticizing agent represents 50% volume average particle diameter and, for example, can be measured by a laser for example, a laser diffraction/scattering method. Specifically, it is the volume average particle diameter corresponding to 50% of the cumulative distribution in a liquid dispersion measured by a laser diffraction/scattering particle size distribution measuring device ("LA-700", manufactured by Horiba Ltd.).

The content of the solid plasticizing agent is preferably from 25 to 80 weight % and more preferably from 35 to 70 weight % based on all of the solid portion of the thermosensitive adhesive composition. A content of the solid plasticizing agent that is too small or large may decrease the adhesibility in either case. In addition, when the solid plasticizing agent is used in combination with a resin having a low glass transition temperature (Tg) and the content of the solid plasticizing agent is too small, a problem may arise in that the adhesibility appears at a temperature in normal preservation environment.

In the present invention, the solid plasticizing agent and the eutectic agent can be separately dispersed and thereafter mixed or both are mixed and then dispersed simultaneously. In either case, the dispersing agent described below is used for dispersion.

Dispersing Agent

There is no specific limit to the dispersing agent for the solid plasticizing agent mentioned above and the eutectic agent and the dispersing agent can be suitably selected according to purpose. Polyvinyl alcohol based resins are preferred.

The polyvinyl alcohol based resin is manufactured by a known method and can contain a monomer copolymerized with other vinyl esters in addition to a saponification compound of polyvinyl acetate. Specific examples of the monomer include olefins, for example, ethylene, propylene and isobutylene; unsaturated acids, for example, acrylic acid, methacrylic acid, crotonic acid, maleic acid, maleic anhydride and itaconic acid and their salts; nitriles, for example, acrylonitriles and methacrylo nitriles; amides, for example, acryl amide and methacryl amide; and olefin sulfonic acids, for example, ethylene sulfonic acid, aryl sulfonic acid, and metharyl sulfonic acid and their salts.

As the polyvinyl alcohol based resins, modified polyvinyl alcohol resins having a sulfonic acid group ($-SO_3X$ group, wherein X represents hydrogen atom, and an alkali metal) in its branch chain is particularly preferred in terms of good compatibility with the solid plasticizing agent and the thermoplastic resin and improvement on the adhesiveness property during heating and melting.

The weight average molecular weight of the polyvinyl alcohol based resin as the dispersing agent is preferably from 10,000 to 40,000. When the weight average molecular weight mentioned above is too small, the adhesibility of the thermosensitive adhesive layer may be weakened, which leads to the deterioration of the anti-blocking property. To the contrary, when the weight average molecular weight is too large, the anti-blocking property is excellent but the adhesibility to a rough surface adherend, for example, a corrugated board and polyethylene unwoven fabric (e.g., envelope), deteriorates and may be rapidly lost especially during preservation after attachment.

The addition amount of the dispersing agent is preferably from 2 to 10 parts by weight based on 100 parts by weight of the solid plasticizing agent. An addition amount that is too small may result in the deterioration of dispersion of the solid plasticizing agent, which may cause trouble in the production process. An addition amount that is too large may cause the deterioration of the adhesibility.

Thermoplastic Resin

There is no specific limit to the thermoplastic resin mentioned above and any known thermoplastic resin can be suitably selected according to purpose. Specific examples thereof include natural rubber latex where a vinyl based monomer is graft-copolymerized, copolymers of acrylic ester, copolymers of methacrylic ester, copolymers of acrylic ester and methacrylic ester, copolymers of acrylic ester and styrene, copolymers of acrylic ester, methacrylic ester and styrene and copolymers of ethylene and vinyl acetate. Among these, copolymers of an ester of acrylic acid are preferred. Specific examples of the copolymers of an ester of acrylic acid include alkylacrylates and alkylmethacrylates having 4 to 17 carbon atoms, for example, 2-ethylhexyl acrylate, butyl acrylate, and isooctyl acrylate. These can be used alone or in combination.

The content of the thermoplastic resin is preferably from 10 to 60% and more preferably from 15 to 50 weight % based on the total solid portion of the thermosensitive adhesive composition. A content of the thermoplastic resin that is too small or large causes the deterioration of the adhesibility in either case, which is not preferred. In addition, when the content of a thermoplastic resin having a low glass transition temperature is too large, a preservation problem (blocking) may arise such that the adhesibility appears at a temperature in the normal preservation environment.

Adhesiveness Imparting Agent

The adhesiveness imparting agent is added to improve the adhesibility of the thermosensitive adhesive layer and has no specific limit with regard to its selection. Any known adhesiveness imparting agent can be suitably selected according to purpose. For example, specific examples thereof include a rosin derivative, a terpene based resin, a petroleum based resin, a phenol based resin and a xylene based resin.

Specific examples of the rosin based resin include rosin, a polymerized rosin and a hydrogenated rosin.

Specific examples of the terpene resins include terpene resin, an aromatic modified terpene resin, a terpene phenol resin and a hydrogenated terpene resin.

These adhesiveness imparting agents are compatible with the thermoplastic resin mentioned above and the solid plasticizing agent mentioned above and can significantly improve the adhesibility of a thermosensitive adhesive layer.

The melting point (or softening point) of the adhesiveness imparting agent mentioned above is preferably not lower than 80° C., and more preferably from 80 to 200° C. When the melting point (softening point) is too low, a preservation problem (deterioration of the anti-blocking property) may arise at a temperature in the normal preservation environment.

The content of the adhesiveness imparting agent mentioned above is preferably from 1 to 30% and more preferably from 1 to 20 weight %. When the content mentioned above is too small, the adhesibility may extremely decrease. When the content is too large, a preservation problem (deterioration of the anti-blocking property) may arise at a temperature in the normal preservation environment and the initial adhesibility in a low temperature environment may be weakened.

In addition to the compositions mentioned above, inorganic materials, for example, titanium oxide, alumina, colloidal silica, kaolin and talc, and organic materials, for example, metal salts of stearic acid, paraffin, natural wax, synthesized wax, natural oil and polystyrene powder, can be added to the thermosensitive adhesive composition of the present invention to prevent blocking. Other compositions, for example, a dispersing agent, an anti-foaming agent and a thickening agent, can be added, if desired.

Method of Manufacturing Thermosensitive Adhesive Composition

The method of manufacturing a thermosensitive adhesive composition of the present invention is a method of manufacturing the thermosensitive adhesive composition mentioned above of the present invention, which includes at least a preparation process of a liquid dispersion of a solid plasticizing agent and optionally a preparation process of a liquid of application for a thermosensitive adhesive layer and other processes.

Preparation Process of Liquid Dispersion of Solid Plasticizing Agent

The preparation process mentioned above of a liquid dispersion of a solid plasticizing agent is a preparation process in which the solid plasticizing agent mentioned above and the eutectic agent represented by the following chemical structure (1) are dispersed in water with a polyvinyl alcohol resin containing sulfonic acid group as a dispersing agent such that each volume average particle diameter is not greater than 2.0 µm.

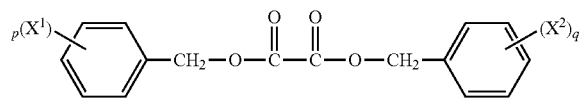

Chemical structure (1)

In the chemical structure (1), $X^1$ and $X^2$ can be the same or different from each other and represent any one of a hydrogen atom, a halogen atom and an alkyl group. p and q represent an integer of from 1 to 5.

There is no specific limit to the dispersion method mentioned above. Any can be suitably selected among known dispersing devices. Specific examples of the dispersing device include a low speed shearing type dispersing device, a high speed shearing type dispersing device, a friction type dispersing device, a high pressure jet type dispersing device, a supersonic dispersing device and a sand mill.

The volume average particle diameter in the liquid dispersion mentioned above of a solid plasticizing agent can be adjusted by suitably selecting the dispersion condition and is not greater than 2.0 µm and preferably not greater than 1.0 µm. The lower limit is preferably not less than 0.1 µm. When the volume average particle diameter mentioned above is too large, the liquid dispersion becomes unstable so that the liquid tends to settle. In addition, blocking easily occurs.

Preparation Process of Liquid of Application for Thermosensitive Adhesive Layer

The preparation process mentioned above of a liquid of application for a thermosensitive adhesive layer is a process of preparing a liquid of application for a thermosensitive adhesive layer (thermosensitive adhesive composition) in which the liquid dispersion of a solid plasticizing agent prepared in the preparation process mentioned above of a liquid dispersion of a solid plasticizing agent, a thermoplastic resin and preferably an adhesiveness imparting agent are mixed and uniformly dispersed.

As the dispersion method mentioned above, the same method as described in the preparation process mentioned above of a liquid dispersion of a solid plasticizing agent can be used.

The thus prepared liquid of application (thermosensitive adhesive composition) for a thermosensitive adhesive layer can be applied to a variety of purposes and is especially preferably used for the thermosensitive adhesive material of the present invention described below.

Thermosensitive Adhesive Material

The thermosensitive adhesive material of the present invention has at least a substrate and a thermosensitive adhesive layer formed of the thermosensitive adhesive composition of the present invention provided on a side of the substrate and optionally, an intermediate layer, a protective layer and other layers. There is provided at least a recording layer on the side of the substrate opposite to the side on which the thermosensitive adhesive layer is provided.

In the thermosensitive adhesive material mentioned above, the adhesibility in the thermosensitive adhesive layer mentioned above to the adhesion surface of an adherend is preferably not less than 400 gf/40 mm and more preferably not less than 500 gf/40 mm when measured two minutes after the adhesion at an environment temperature of from 0 to 40° C.

When the adhesibility is too weak, the thermosensitive adhesive material, for example, a label, tends to be peeled off when rubbed after the thermosensitive adhesive material is attached to a rough surface of, for example, a corrugated board.

In addition, the adhesibility is preferably not less than 500 gf/40 mm and more preferably not less than 1,000 gf/40 mm when measured two minutes after the adhesion at an environment temperature of from 5 to 22° C.

In addition, the adhesibility is preferably not less than 400 gf/40 mm and more preferably not less than 500 gf/40 mm when measured one week after the adhesion at an environment temperature of from 0 to 40° C. An adhesibility that is too weak may float, for example, a label when left for a long time after the adhesion thereof.

The adhesibility mentioned above can be measured, for example, as follows:

First, a thermosensitive adhesive material is cut to a size of a width of 4 cm and a length of 10 cm; The surface of the thermosensitive adhesive layer is activated by contacting a thermal head (TH-0976SP, manufactured by TEC) under the conditions of 8 dot/mm, a resistance of 500Ω, with all dots energized, an activation energy of 27.0 mJ/mm$^2$, a printing speed of 100 mm/s and a pressure of 6 kgf/line of a platen roll having a diameter of 1 cm; Next, the thermosensitive adhesive material is attached to the adhesion surface of an adherend by a rubber roller with an applying pressure of 2 kg in the longitudinal direction; The thermosensitive adhesive material is peeled off two minutes and one week after the adhesion under the conditions of a release angle of 180° C. and a releasing speed of 300 mm/min; The adhesibility at the time is measured by a force gauge; and the data are read with an interval of 0.1 second and the averaged values are obtained, which is determined as the adhesibility.

The adhesibility is determined by the surface roughness of the adhesion surface of an adherend and the adhesibility of a thermosensitive adhesive material formed of a thermosensitive adhesive composition.

With regard to the adhesion surface of the adherend mentioned above, the arithmetical mean surface roughness (Ra) of a contour curve defined by the surface texture parameter of JIS (JIS B0601-1994) is preferably not less than 0.3 μm, more preferably not less than 2 μm and particularly preferably from 2.2 to 5.0 μm.

The arithmetical mean surface roughness (Ra) of the adhesion surface of the adherend can be measured by, for example, a surface roughness measuring device (SURFCOM 570A, manufactured by Tokyo Seimitsu Co., Ltd.).

Adherend

There is no specific limit to the adherend to which the thermosensitive adhesive is attached. The thermosensitive adhesive material is suitably selected according to purpose. Although it is difficult to attach a typical thermosensitive adhesive material to a corrugated board and a polyethylene unwoven fabric (e.g., envelope) having an arithmetical mean surface roughness (Ra) of not less than 2 μm among the corrugated boards and the polyethylene unwoven fabric, the thermosensitive adhesive material of the present invention is suitable which has a strong adhesibility so that the attachment force is strong.

As the adherend mentioned above, in addition to those mentioned above, a wide variety of adherends, for example, resin boards formed of, for example, polyolefins, for example, polyethylene and polypropylene, acryl, polyethylene terephthalate (PET), polystyrene and nylon, metal boards, for example, SUS and aluminum, paper products, for example, envelopes and corrugated boards, polyolefin wrapping materials, polyvinyl wrapping materials, and polyethylene unwoven fabric (envelopes) can be used.

Substrate

As to the substrate mentioned above, there is no specific limit with regard to its form, structure and size. Any can be suitably selected according to purpose. Specific examples of the form include a plate form. The structure can be a single layer structure or a multi-layered structure. The size can be suitably selected according to the size of the thermosensitive adhesive material.

There is no specific limit to the material for the substrate. Any can be suitably selected according to purpose. For example, inorganic materials or organic materials can be used. Specific examples of the inorganic materials include glass, quartz, silicon, silicon oxides, aluminum oxides, $SiO_2$, and metals. Specific examples of the organic materials include paper, for example, quality paper, art paper, coated paper and synthesized paper, cellulose derivatives, for example, cellulose triacetate, polyester resins, for example, polyethylene terephthalate (PET) and polybutylene terephthalate, and polyolefins, for example, polycarbonate, polystyrene, polymethyl methacrylate, polyethylene and polypropylene. Among these, quality paper, art paper and coated paper are particularly preferred. These can be used alone or in combination.

It is preferred that the substrate is surface-treated by corona discharging treatment, oxidization reaction treatment (chromic acid, etc.), etching treatment, easy adhesion treatment and anti-charging treatment to improve the adhesiveness of the thermosensitive adhesive layer. In addition, it is also preferred that a white pigment, for example, titanium oxide, is added to the substrate to make the color of the substrate white.

There is no specific limit to the thickness of the substrate. It is possible to suitably select any according to purpose. The thickness is preferably from 50 to 2,000 μm and more preferably from 100 to 1,000 μm.

Thermosensitive Adhesive Layer

The thermosensitive adhesive layer contains the thermosensitive adhesive composition of the present invention and other optional compositions.

As the other optional compositions, there can be added inorganic materials, for example, titanium oxides, aluminum, colloidal silica, kaolin and talc, and organic materials, for example, metal salts of stearic acid, paraffin, natural wax, synthesized wax, natural oil, and polystyrene powder. If desired, other compositions, for example, a dispersing agent, an antifoaming agent and a viscosity improving agent, can be added.

There is no specific limit to the thermosensitive adhesive layer mentioned above, which can be formed according to a known method. For example, the thermosensitive adhesive layer can be suitably formed by a method using a liquid of application for a thermosensitive adhesive layer formed of a combination of the compositions mentioned above.

Specific examples of the application method include blade application methods, gravure application methods, gravure offset application methods, bar application methods, roll application methods, knife application methods, air knife application methods, comma application methods, U comma application methods, AKKU application methods, smoothing application methods, microgravure application methods, reverse roll application methods, four or five roll application methods, dip application methods, falling curtain application methods, slide application methods and dye application methods.

The drying conditions during the application or printing are that drying is desired to be performed in the temperature range in which a solid plasticizing agent and a eutectic agent to be used are not melted. As the drying method, in addition to a heated air drying, drying methods in which a heat source using infrared, microwave or high frequency is used can be used. The application amount of the liquid of application mentioned above for a thermosensitive adhesive layer is preferably from 2 to 35 g/m$^2$ and more preferably from 5 to 25 g/m$^2$ in dry mass. When the application amount of the liquid of application mentioned above for a thermosensitive adhesive layer is too small, a sufficient adhesibility may not be obtained during the adhesion upon application of heat. In addition, when an intermediate layer is provided, the antiblocking property may be inferior because a thermoplastic resin having a low glass transition temperature (Tg) is used in the intermediate layer. When the application amount is too large, the adiabatic effect of an intermediate layer decreases and the economicality may be inferior, which is not preferred.

Due to the structure mentioned above, the thermosensitive adhesive material of the present invention has a strong adhesibility against a rough surface adherend, for example, a corrugated board and polyethylene unwoven fabric (envelope, etc,) and polyolefin wrap, does not significantly decrease its adhesibility over time, can be thermally activated with a low energy, and has an excellent anti-blocking property.

Recording Layer

The recording layer mentioned above is a layer on which images, etc., can be recorded, has no specific limit and can be suitably selected according to purpose. Suitable examples thereof include a thermosensitive recording layer, an ink jet recording layer, an ink receptive layer for thermal transfer and an electrophotographic recording layer.

The recording layer is preferred to be provided on the side of a substrate opposite to the side on which the thermosensitive adhesive layer is provided.

In these recording layers, information, for example, images and characters, can be recorded (formed) in a single color (for example, black color) or multiple colors (two colors, three colors, full colors, etc.). In addition, a single color or multicolor processing printing can be performed. Such processing printing has no specific limit and can be suitably selected according to purpose. UV processing printing using ink containing a UV curing resin is preferred in terms of the improvement on the anti-blocking property.

Among these recording layers, a thermosensitive recording layer and an ink receptive layer for thermal transfer are preferred and especially a thermosensitive recording layer is particularly preferred. When the recording layer is a thermosensitive recording layer, for example, a desired color-developed image can be recorded (formed) in the thermosensitive recording layer mentioned above by applying heat imagewise from the side of the thermosensitive recording layer in addition to the application of heat to the thermosensitive adhesive layer. Thereby, a value can be added to the thermosensitive adhesive material mentioned above.

Thermosensitive Recording Layer

The thermosensitive recording layer is mainly formed of a leuco dye and a coloring developing agent, and further contains a binder resin, a sensitizing agent and other optional compositions.

The leuco dyes mentioned above have no specific limit and can be suitably selected among any known leuco dyes according to purpose. Specific examples thereof include triphenylmethane based dyes, fluoran based dyes, phenothiazine based dyes, auramine based dyes, spiropyran based dyes and indolinophthalido based dyes.

Specific examples of the leuco dyes mentioned above include 3,3-bis(p-dimethylaminophenyl)phthalide, 3,3-bis (p-dimethylaminophenyl)-6-dimethylaminophthalide (also named as crystal violet lactone),
3,3-bis(p-dimethylaminophenyl)-6-diethylaminophthalide,
3,3-bis(p-dimethylaminophenyl)-6-chlorophthalide,
3,3-bis(p-dibutylaminophenyl)phthalide,
3-cyclohexylamino-6-chlorofluoran,
3-dimethylamino-5,7-dimethylfluoran,
3-diethylamino-7-chlorofluoran, 3-diethylamino-7-methylfluoran,
3-diethylamino-7,8-benzofluoran,
3-diethylamino-6-methyl-7-chlorofluoran,
3-(N-p-tolyl-N-ethylamino)-6-methyl-7-anilinofluoran,
3-pyrrolidino-6-methyl-7-anilinofluoran,
2-{N-(3'-trifluoromethylphenyl)amino}-6-diethylamino fluoran,
2-{3,6-bis(diethylamino)-9-(o-chloroanilino) xanthyl}benzoic acid lactam,
3-diethylamino-6-methyl-7-(m-trichloromethylanilino)fluoran,
3-diethylamino-7-(o-chloroanilino)fluoran,
3-dibutylamino-7-(o-chloroanilino)fluoran,
3-N-methyl-N-amylamino-6-methyl-7-anilinofluoran,
3-N-methyl-N-cyclohexylamino-6-methyl-7-anilinofluoran,
3-diethylamino-6-methyl-7-anilinofluoran,
3-(N,N-diethylamino)-5-methyl-7-(N,N-dibenzylamino) fluoran, benzoylleuco methyleneblue,
6'-chloro-8'-methoxybenzoindolino pyrylospirane,
6'-bromo-3'-methoxybenzoindolinopyrylospirane,
3-(2'-hydroxy-4'-dimethylaminophenyl)-3-(2'-methoxy-5'-chlorophenyl)phthalide,
3-(2'-hydroxy-4'-dimethylaminophenhyl)-3-(2'-methoxy-5'-nitrophenyl)phthalide,
3-(2'-hydroxy-4'-dimethylaminophenyl)-3-(2'-methoxy-5'-methylphenyl)phthalide,
3-diethylamino-6-methyl-7-(2',4'-dimethylanilino)fluoran,
3-(2'-methoxy-4'-dimethylaminophenyl)-3-(2'hydroxy-4'-chloro-5'-methylphenyl)phthalide,
3-morpholino-7-(N-propyltrifluoromethyl anilino)fluoran,
3-diethylamino-5-chloro-7-(N-benzyltrifluoromethyl anilino) fluoran,
3-pyrolidino-7-(di-p-chlorophenyl)methylaminofluoran,
3-diethylamino-5-chloro-7-(α-phenylethylamino)fluoran,
3-(N-ethyl-p-toluidino)-7-(α-phenylethylamino)fluoran,
3-diethylamino-7-(α-methoxycarbonylphenyl amino)fluoran,
3-diethylamino-5-methyl-7-(α-phenylethylamino)fluoran,
3-diethylamino-7-piperidino fluoran,
2-chloro-3-(N-methyltoluidino)-7-(p-n-butylanilino)fluoran,
3-diethylamino-6-methyl-7-mesidino-4',5'-benzofluoran,
3-diethylamino-6-methyl-7-(2',4'-dimethylanilino)fluoran,
3-(p-dimethylaminophenyl)-3-{1,1-bis(p-dimethylaminophenyl)ethylene-2-yl}phthalide,
3-(p-dimethylaminophenyl)-3-{1,1-bis(p-dimethylaminophenyl)ethylene-2-yl}-6-dimethylaminophthalide,
3-(p-dimethylaminophenyl)-3-(1-p-dimethylaminophenyl-1-phenylethylene-2-yl)phthalide,
3-(p-dimethylaminophenyl)-3-(1-p-dimethylaminophenyl-1-p-chlorophenyl ethylene-2-yl)-6-dimethylaminophthalide,
3-(4-dimethylamino-2'-methoxy-3-(1"-p-dimethylaminophenyl-1"-p-chlorophenyl-1",3"-butadiene-4"-yl)benzophthalide,
3-(4'-dimethylamino-2'-benzyloxy)-3-(1"-p-dimethylamino phenyl-1"-phenyl-1",3"-butadiene-4"-yl)benzophthalide, 3-dimethylamino-6-dimethylaminofluorene-9-spiro-3'-(6'-dimethylamino)phthalide,
3,3-bis{2-(p-dimethylaminophenyl)-2-(p-methoxyphenyl) ethenyl}-4,5,6,7-tetrachloropphthalide,
bis(p-dimethylaminostyryl)-1-naphthalene sulfonylmethane,
3-(N-methyl-N-propylamino)-6-methyl-7-anilinofluoran,
3-diethylamino-6-methyl-7-anilinofluoran,
3,6-bis(dimethylamino)fluoranspiro(9,3')-6'-dimethylamino phthalide,
3-diethylamino-6-chloro-7-anilinofluoran,
3-{N-ethyl-N-(2-ethoxypropyl)amino}-6-methyl-7-anilino fluoran,
3-{N-ethyl-N-tetrahydrofurfurylamino}-6-methyl-7-anilino fluoran, and
3-diethylamino-6-methyl-7-mesidino-4',5'-benzofluoran.

These can be used alone or in combination.

The coloring developing agent mentioned above has no specific limit and can be suitably selected among known electron receptive compounds according to purpose. Specific examples are phenol compounds, thiophenol compounds, thiourea derivatives, organic acids and metal salts thereof. Specific examples of the coloring developing agents include:
4,4'-isopropylidene bisphenol,
3,4'-isopropylidene bisphenol,
4,4'-isopropylidenebis(o-methylphenol),
4,4'-s-butylidenebisphenol,
4,4'-isopropylidenebis(o-tertiary-butylphenol),
4,4'-cyclohexylidenediphenol,
4,4'-isopropylidenebis(2-chlorophenol),
2,2'-methylenebis(4-methyl-6-tertiary-butylphenol),
2,2'-methylenebis(4-ethyl-6-tertiary-butylphenol),
4,4'-butylidenebis(6-tertiary-butyl-2-methyl)phenol,
1,1,3-tris(2-methyl-4-hydroxy-5-tertiary-butylphenyl)butane,
1,1,3-tris(2-methyl-4-hydroxy-5-cyclohexylphenyl)butane,
4,4'-thiobis(6-tertiary-butyl-2-methyl)phenol,
4,4'-diphenolsulfone, 4,2'-diphenolsulfone,
4-isopropoxy-4'-hydrosydiphenylsulfone,
4-benzyloxy-4'-hydroxydiphenylsulfone,
4,4'-diphenolsulfoxide, p-hydroxyisopropyl benzoate,
p-hydroxybenzyl benzoate, benzyl protocatechuic acid,
stearyl gallate, lauryl gallate, octyl gallate,
1,7-bis(4-hydroxyphenylthio)-3,5-dioxaheptane,
1,5-bis(4-hydroxyphenylthio)-3-oxaheptane,
1,3-bis(4-hydroxyphenylthio)-propane,
2,2-methylenebis(4-ethyl-6-tertiary-butylphenol),
1,3-bis(4-hydroxyphenylthio)-2-hydroxypropane,
N,N'-diphenylthio urea, N,N'-di(m-chlorophenyl)thiourea,
salicylanilide, 5-chlorosalicylanilide, salicyl-o-chloroanilide,
2-hydroxy-3-naphtoic acid,
antipyrin complex of zinc thiocyanate,
zinc salt of 2-acetyloxy-3-naphthoic acid,
2-hydroxy-1-naphthoic acid, 1-hydroxy-2-naphthoic acid,
metal salts of metals such as zinc, aluminum and calcium of hydroxy naphthoic acid, bis(4-hydroxyphenyl)methyl acetate,
bis(4-hydroxyphenyl)benzyl acetate,
4{β-(p-methoxyphenoxy)ethoxy}salicylic acid,
1,3-bis(4-hydroxycumyl)benzene, 1,4-bis(4-hydroxycumyl) benzene,
2,4'-diphenolsulfone, 3,3'-diallyl-4,4'-diphenolsulfone,
tetrabromobisphenol A, tetrabromobisphenol S,
4,4'-thiobis(2-methylphenol),
3,4-hydroxy-4'-methyl-diphenylsulfone, and
4,4'-thiobis(2-chlorophenol). These can be used alone or in combination.

The addition amount in the thermosensitive recording layer of the coloring developing agent has no specific limit, can be suitably selected according to purpose and is preferably from 1 to 20 parts by weight and more preferably from 2 to 10 parts by weight based on 1 part of the lueco dye mentioned above.

The binder resin mentioned above has no specific limit and can be suitably selected among known binder resins according to purpose. Specific examples thereof include polyvinyl alcohol; amylum or its derivatives; cellulose derivatives, for example, methoxy cellulose, hydroxyl cellulose, carboxy methyl cellulose, methyl cellulose and ethyl cellulose; water soluble polymers, for example, polyacrylic soda, polyvinyl pyrolidone, copolymers of acrylmide and acrylic ester, three-dimensional copolymers of acryl amide, acrylic ester, and methacrylic acid, alkali salt copolymers of styrene and maleic anhydrate, alkali salt copolymers of isobutylene and maleic anhydrate, polyacylic amide, alginic soda, gelatin and casein; emulsions of polyvinyl acetate, polyurethane, polyacrylic acid, polyacrylic esters, polymethacrylic acid, polybutyl methacrylate, copolymers of vinyl chloride and vinyl acetate, copolymers of ethylene, vinyl acetate, etc.; latexes, for example, copolymers of styrene and butadiene, acryl based copolymers of styrene and butadiene. These can be used alone or in combination.

Various kinds of thermomelting materials can be used as fillers in the thermosensitive recording layer. Specific examples of the thermomelting materials include aliphatic acids, for example, stearic acid and behenic acid; aliphatic acid amides, for example, stearic acid amide and palmitic acid amide; metal salts of aliphatic acids, for example, zinc stearate, aluminum stearate, calcium stearate, zinc palmitate and zinc behenate; p-benzyl biphenyl, terphenyl, triphenyl methane, p-benzyloxy benzyl benzoate, β-benzyloxy naphthalene, β-naphthoic acid phenyl ester, 1-hydroxy-2-naphthoic acid phenyl ester, 1-hydroxy-2-naphthoic acid methyl ester, diphenyl carbonate, terephthalic acid dibenzyl ester, terephthalic dimethyl ester, 1,4-dimethoxynaphthalene, 1,4-diethoxynaphthalene, 1,4-dibenzyloxy naphthalene, 1,2-bis (phenoxy)ethane, 1,2-bis(3-methylphenoxy)ethane, 1,2-bis (4-methylphenoxy) ethane, 1,4-bis(phenoxy)butane, 1,4-bis (phenoxy)-2-butene, 1,2-bis(4-methoxyphenylthio)ethane, dibenzoyl methane, 1,4-bis(phenylthio)butane, 1,4-bis(phenylthio)-2-butene, 1,2-bis(4-methoxyphenylthio)ethane, 1,3-bis(2-vinyloxyethoxy) benzene, 1,4-bis(2-vinyloxyethoxy) benzene, p-(2-vinyloxyethoxy)biphenyl, p-allyloxybiphenyl, p-propargyl oxybiphenyl, dibenzoyloxymethane, 1,3-dibenzoyloxypropane, dibenzyl disulfide, 1,1-diphenylethanol, 1,1-diphenylpropanol, p-(benzyloxy)benzyl alcohol, 1,3-diphenoxy-2-propano, N-octadecyl carbamoyl-p-methoxy carbonylbenznen, N-octadecyl carbamoyl benzene, oxalic acid dibenzyl ester, and 1,5-bis(p-methoxyphenyloxy)-3-oxapentane. These can be used alone or in combination.

Various kinds of helping additive compositions, for example, a surface active agent and a lubricant agent, can be used for the thermosensitive recording layer mentioned above, if desired. Specific examples of the lubricant include higher aliphatic acids and metal salts thereof, higher aliphatic acid amides, higher aliphatic acid esters, animal waxes, vegetable waxes, mineral waxes and oil waxes.

The thermosensitive recording layer has no specific limit and can be formed by a known method. For example, a thermosensitive recording layer can be formed as follows: a leuco dye and a coloring developing agent are separately pulverized and dispersed together with a binding agent and other compositions by a dispersing device, for example, a ball mill, an attritor and a sandmill such that the dispersion particle diameter is from 1 to 3 μm; thereafter a liquid of application for a thermosensitive recording layer is prepared by mixing with a filler, a liquid of dispersion of a thermomelting material (sensitizing agent), etc. by a specific prescription and applied to a substrate.

The thickness of the thermosensitive recording layer cannot be completely regulated because the thickness depends on the composition of the thermosensitive recording layer and the use application of the thermosensitive adhesive material but is preferably from 1 to 50 μm and more preferably from 3 to 20 μm.

Ink Receptive Layer for Thermal Transfer Recording

The ink receptive layer for thermal transfer recording contains a filler, a binder resin, a water resistant additive and other optional compositions.

The filler has no specific limit and can be suitably selected according to purpose. Specific examples include fine powder of calcium carbide, silica, titanium oxide, aluminum hydroxide, clay, baked clay, magnesium silicate, magnesium carbonate, white carbon, zinc oxide, barium sulfate, surface-treated calcium carbonate, surface-treated silica, urea-formalin resin, copolymers of styrene and methacrylic acid and polystyrene.

The binder resin has no specific limit and can be suitably selected among known water soluble resins according to purpose. Specific examples include polyvinyl alcohol; amylum or derivatives thereof; cellulose derivatives, for example, methoxy cellulose, hydroxy ethyl cellulose, carboxy methyl cellulose, methyl cellulose and ethyl cellulose; and water soluble polymers, for example, polyacrylic soda, polyvinyl pyrolidone, copolymers of acrylmide and acrylic ester, three-dimensional copolymers of acryl amide, acrylic ester and methacrylic acid, alkali salts of copolymers of styrene and maleic anhydride, alkali salts copolymers of isobutylene and maleic anhydride, polyacylic amide, alginic soda, gelatin and casein.

The mixing ratio of the filler and the water-soluble resin in the ink receptive layer depends on the anti-blocking property and the mixing ratio (filler:water soluble resin) by weight of the filler mentioned above and the water-soluble resin is preferably from 1:0.1 to 1:0.2.

The water resistant additive mentioned above has no specific limit and can be suitably selected according to purpose. Specific examples include formaldehyde, glyoxal, chrome alum, melamine, melamine-formaldehyde resins, polyamide resins, and polyamide-epichlorohydrin resins.

The ratio of the water resistant additive to the water soluble resin also depends on the anti-blocking property. The content ratio (solid portion) by weight is preferably from 0.3 to 0.5 parts by weight of the water resistant additive based on 1 part by weight of the water soluble resin. The ink receptive layer is thus formed with a specific ratio of the filler and the water soluble resin and that of the water soluble resin and the water resistant additive. Furthermore, the surface of the ink receptive layer can be treated by, for example, calendering, to have a smoothness of not less than 500 seconds to further improve the quality of printing in addition to the effect by the filler mentioned above.

Intermediate Layer

The intermediate layer (undercoating layer) mentioned above can be suitably provided between either the thermosensitive adhesive layer and the substrate or the recording layer (especially, thermosensitive recording layer) and the substrate. This is advantageous in that, when the thermosensitive adhesive layer is thermally activated, the thermal energy from a thermal head can be efficiently utilized so that the adhesibility of the thermosensitive adhesive layer sufficiently appears with a small amount of energy. In addition, when the recording layer, especially, the thermosensitive recording layer, is provided to the side of the substrate opposite to the side on which the thermosensitive adhesive layer is provided and the thermosensitive adhesive layer is heated with a high energy, the energy reaches the thermosensitive recording layer so that quality deterioration, for example, fogging, tends to occur. However, due to the presence of the intermediate layer, there is an advantage point in that the adiabatic effect to the thermosensitive recording layer is sufficient to effectively prevent the occurrence of problems, for example, fogging on the thermosensitive recording layer.

There is no specific limit to the air ratio in the intermediate layer mentioned above, that is, the ratio (%) of the air in the intermediate layer and the ratio can be suitably selected according to purpose. The higher the ratio is, the more excellent the adiabatic effect is, which is advantageous in that it is possible to effectively improve the adhesiveness characteristics of the thermosensitive adhesive layer. The intermediate layer (undercoating layer) mentioned above can be formed in various forms. A preferred form is non-expandable and contains hollow particles.

The hollow particles mentioned above are, for example, hollow particulates having a shell of a thermoplastic resin and a hollow ratio of from 30 to 95% and a porous dye.

The hollow particle mentioned above represents an already expanded hollow particle having a shell of a thermoplastic resin with air and other gases inside. The hollow ratio mentioned above represents the ratio of the volume based on the outer diameter and the volume based on the inner diameter of a hollow particle.

The hollow particulate having a shell of the thermoplastic resin and a hollow ratio of from about 30 to about 95% is an already expanded hollow particulate containing air and other gases inside. The average particle diameter of this hollow particulate is preferably from 0.2 to 20 μm and more preferably from 0.5 to 10 μm. When the average particle diameter (outer particle diameter) is too small, problems may arise such that it is technically difficult to make the particle hollow and the function as the intermediate layer is insufficient. When the average particle diameter is too large, the smoothness of the surface after coating and drying tends to be reduced, resulting in non-uniformity of coating of the thermosensitive adhesive layer. To make the coating uniform, the thermosensitive adhesive agent is desired to be coated in an amount more than necessary. Therefore, it is preferred that the distribution of such hollow particulates is within the range mentioned above with regard to the particle diameter and simultaneously has a uniform distribution spectrum with a small spread. Furthermore, with regard to the spherical hollow particles formed of the thermoplastic resin, the hollow ratio thereof is preferably not less than 30% and more preferably not less than 70. When the hollow ratio is too small, a sufficient adiabatic effect is not obtained. Therefore, the thermal energy is emitted outside through a substrate and the efficiency of the heat for activating an adhesive agent deteriorates, which is not preferred.

As described above, the hollow particulates have a shell of a thermoplastic resin. As this thermoplastic resin, copolymer resins based on vinylidene chloride and acrylonitrile are especially preferred.

In addition, the porous dye for use in an intermediate layer has no specific limit and can be suitably selected according to purpose. For example, organic dyes, for example, urea formaldehyde resins, and inorganic dyes, for example, shirasu clay, can be mentioned.

A non-expanding intermediate layer can be obtained by dispersing the hollow particulates and the porous dye in water together with a binder resin and coating that to a substrate followed by drying. In this case, the coated amount of the hollow particulates is at least 1 g per 1 m² of the substrate and further preferably from about 2 to about 15 g per 1 m². In addition, a sufficient coated amount of the binder resin is an amount in which the intermediate layer can be strongly combined with the substrate and is typically from 2 to 50% by weight based on the total amount of the hollow particulates and the binder resin.

The binder for use in forming the non-expanding intermediate layer mentioned above is suitably selected from at least either of a known water soluble polymer or a known aqueous polymer emulsion.

Specific examples of the water soluble polymer include polyvinyl alcohol; amylum or derivatives thereof; cellulose derivatives, for example, methoxy cellulose, hydroxyethyl cellulose, carboxy methyl cellulose, methyl cellulose and ethyl cellulose; polyacrylic soda, polyvinyl pyrolidone, copolymers of acrylmide and acrylic ester, three-dimensional copolymers of acryl amide, acrylic ester, and methacrylic acid, alkali salts of copolymers of styrene and maleic anhydrate, alkali salts of copolymers of isobutylene and maleic anhydrate, polyacylic amide, alginic soda, gelatin and casein.

Specific examples of the aqueous polymer emulsion include latexes, for example, copolymers of styrene and butadiene and copolymers based on styrene, butadiene and acryl, and emulsions of, for example, vinyl acetate resins, copolymers of vinyl acetate and acrylic acid, copolymers of styrene and acrylic ester, acrylic ester resins, and polyurethane resins.

The expanding filler is a hollow thermoplastic resin filler having a shell of a thermoplastic resin and an expanding agent inside which is a solvent having a low boiling point. Various kinds are used. The particle diameter thereof is preferably from 2 to 50 min unexpanded state and preferably from 10 to 100 μm and more preferably from 10 to 50 μm in expanded state. Specific examples of the thermoplastic resin forming the shell of the thermoplastic resin filler include polystyrene, polyvinyl chloride, polyvinylidene chloride, polyvinyl acetate, polyacrylic ester, polyacrylo nitrile, polybutadiene, and their copolymers. In addition, propane, butane and their mixture are typically used as the expanding agent contained in the shell.

The expanding intermediate layer mentioned above can be formed by coating and drying the expanding thermoplastic resin filler to a substrate together with a binding agent, and attaching a heated plate to the coated surface to heat and expand the thermoplastic resin filler. The coated amount of the thermoplastic resin filler is preferably not less than 1 g per 1 m² of a substrate and more preferably from 2 to 5 g as non-expanded filler. In addition, a sufficient used amount of the binding agent is an amount in which the expanding intermediate layer can be strongly attached to a substrate and is typically from 5 to 50 weight % based on the total amount of the non-expanded filler and the binding agent. In addition, the heated expanding temperature is a temperature at which a thermoplastic resin forming the shell of a filler is softened. Typically, the expansion ratio is preferably from 2 to 4 times and more preferably from 2 to 3 times and is suitably selected to achieve the expansion mentioned above.

The surface of the expanding intermediate layer formed on a substrate as described above is considerably convexoconcave. Therefore, it is preferred to make the surface smooth by calendering treatment after the formation of an expanding intermediate layer (after the layer has been heated and expanded). In addition, it is possible to provide a single or multiple under coating layers on or beneath the surface of the expanding intermediate layer, if desired.

In the intermediate layer mentioned above, a filler, a thermomelting material (sensitizing agent), a surface active agent, etc., can be used in combination with the hollow particulates, the porous dyes or the expanding filler and the binder, if desired. In this case, specific examples of the filler include inorganic fine powder of, for example, calcium carbonate, silica, zinc oxide, titanium oxide, aluminum hydroxide, zinc hydroxide, barium sulfate, clay, talc, and surface treated calcium and silica, organic fine powder of, for example, urea-formalin resins, copolymers of styrene and methacrylic acid, and polystyrene resins. In addition, specific examples of the thermomelting material (sensitizing agent) include higher aliphatic acids or their esters, amides or metal salts, thermomelting organic compounds having a melting point of 50 to 200° C., for example, various kinds of waxes, condensed compounds of aromatic carboxylic acids and amines, esters of phenyl benzoate, higher straight chained glycols, 3,4-epoxy-hexahydrophthalic acid dialkyl, higher ketones, and p-benzyl biphenyl.

Protective Layer

The protective layer mentioned above can be provided on the recording layer mentioned above in order to improve the barrier property, the head matching property, the property of writing-down on a recording material, etc., of the recording layer mentioned above.

The protective layer mentioned above has no specific limit and can be suitably selected according to purpose. Specific examples include compounds mainly formed of dyes, binding agents, cross-linking agents and lubricants.

The protective layer can be suitably formed by the coating methods mentioned above.

In the thermosensitive adhesive material of the present invention, a printed image can be formed on the recording layer mentioned above, or a protective layer on the recording layer. As printing ink, for example, U curing ink is most suitable for thermosensitive recording paper since UV curing ink is quick-drying. Specific examples of the UV curing ink (UV ink) include UV ink of UV RNC, UV NVR, UV SOYA and SOYA-RNC, manufactured by T & K Toka Co., Ltd.; and UV ink of FD μL, manufactured by Toyo Ink Mfg Co., Ltd.

The thermosensitive adhesive material of the present invention is cut before or after the thermal activation (when heated) of its thermosensitive adhesive layer for suitable usage. In addition, the thermosensitive adhesive material can have a cut line beforehand. Thereby, the thermosensitive adhesive material has an advantage in that the thermosensitive adhesive material can have various applicability to, for example, labels and tags.

The form of the thermosensitive adhesive material of the present invention has no specific limit. Suitable specific examples include label forms, sheet forms, and roll forms. Among these, in terms of convenience, depository and easy handling, it is preferred that the thermosensitive adhesive material is reeled off around a core material having a cylindrical form and preserved in a roll form.

The method of thermally activating the thermosensitive adhesive layer mentioned above in the thermosensitive adhesive material of the present invention has no specific limit and can be suitably selected according to purpose. For example, there can be mentioned an activation method using hot air, an active method using a heated roll, and an activation method using a thermal head.

Among these, the activation method using a thermal head is preferred. This has an advantage in that the recording on the thermosensitive recording layer mentioned above and the thermal activation of the thermosensitive adhesive layer mentioned above can be performed by heating both sides of the thermosensitive adhesive material mentioned above with a typical thermosensitive recording printing device.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Examples of the present invention are described below but the present invention is not limited to these Examples.

Example 1

Manufacturing of Thermosensitive Adhesive Material
Preparation of Liquid Dispersion [Liquid A1] of Solid Plasticizing Agent Liquid dispresion [Liquid A1] of a solid plasticizing agent is prepared by dispersing the mixture formed of the following compositions using a sand mill such that the volume average particle diameter is 1.2 μm.

| | |
|---|---|
| 2-(2'-hydroxy-3'-t-butyl-5'-methylphenyl)-5-chlorobenzotriazole functioning as solid plasticizing agent | 100 parts by weight |
| Copolymer of vinyl alcohol sodium arylsulfate (GOHSELAN L-3266, Nippon Synthetic Chemical Industry Co., Ltd., 20 weight % aqueous solution, weight average molecular weight = 15,000) functioning as dispersing agent | 33 parts by weight |
| Surface active agent (NEWCOL-290M, manufactured by Nippon Nyukazai Co., Ltd.) | 0.6 parts by weight |
| Water | 300 parts by weight |

Preparation of Liquid Dispersion [Liquid A2] of Eutectic Agent

Liquid dispersion [Liquid A2] of a eutectic agent is prepared by dispersing the mixture formed of the following compositions using a sand mill such that the volume average particle diameter is 0.5 μm.

| | |
|---|---|
| di-p-methylbenzyl ester of oxalic acid represented by the following chemical structure (1-2) functioning as eutectic agent | 100 parts by weight |

Chemical structure (1-2)

$$CH_3 - \bigcirc - CH_2 - O - \overset{O}{\underset{\|}{C}} - \overset{O}{\underset{\|}{C}} - O - CH_2 - \bigcirc - CH_3$$

| | |
|---|---|
| Copolymers of vinyl alcohol sodium arylsulfate (GOHSELAN L-3266, Nippon Synthetic Chemical Industry Co., Ltd., 20 weight % aqueous solution, weight average molecular weight = 15,000) functioning as dispersing agent | 33 parts by weight |
| Surface active agent (NEWCOL-290M), Nippon Nyukazai Co., Ltd.) | 0.6 parts by weight |
| Water | 300 parts by weight |

Preparation of Liquid Dispersion [Liquid A] of Solid Plasticizing Agent

Liquid dispersion [Liquid A] of solid plasticizing agent is prepared by mixing 100 parts by weight of the liquid dispersion [Liquid A1] mentioned above of a solid plasticizing agent and 33 parts by weight of the liquid dispersion [Liquid A2] mentioned above of a eutectic agent.

Preparation of Thermosensitive Adhesive Liquid of Application [Liquid B]

Thermosensitive adhesive liquid of application [Liquid B] is prepared by mixing and dispersing the following compositions.

| | |
|---|---|
| Emulsion of thermoplastic resin (AP5570, main composition: acrylic acid-2-ethylhexyl resin, solid portion 55% by weight, glass transition temperature (Tg) = −65° C., manufactured by Showa Highpolymer Co., Ltd.) | 10 parts by weight |
| Liquid dispersion [Liquid A] of solid plasticizing agent | 66 parts by weight |
| Adhesiveness imparting agent (E-100, main composition: terpene phenol, solid portion: 50% by weight, softening point: 145° C., manufactured by Arakawa Chemical Industries, Ltd.) | 7 parts by weight |

Next, the obtained thermosensitive adhesive liquid [Liquid B] of application is coated and dried on the bottom side (the side on which a recording layer was not provided) of one side coated paper having a grammage of 80 g/m² such that the dry mass is 11 g/m² to manufacture a thermosensitive adhesive material.

Example 2

Manufacturing of Thermosensitive Adhesive Material

A thermosensitive adhesive material was manufactured in the same manner as in Example 1 except that the di-p-methylbenzyl ester of oxalic acid functioning as a eutectic agent in the liquid dispersion [Liquid A] of solid plasticizing agent is changed to a dibenzyl ester of oxalic acid represented by the following Chemical Structure (1-1).

Chemical structure (1-1)

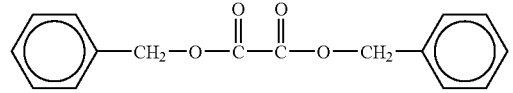

Example 3

Manufacturing of Thermosensitive Adhesive Material

A thermosensitive adhesive material is manufactured in the same manner as in Example 1 except that the mixing ratio of the liquid dispersion [Liquid A] of a solid plasticizing agent is changed to the following.

| | |
|---|---|
| Liquid dispersion [Liquid A1] mentioned above of solid plasticizing agent | 100 parts by weight |
| Liquid dispersion [Liquid A2] mentioned above of eutectic agent | 41 parts by weight |

Example 4

Manufacturing of Thermosensitive Adhesive Material

A thermosensitive adhesive material is manufactured in the same manner as in Example 1 except that the mixing ratio of the liquid dispersion [Liquid A] of a solid plasticizing agent is changed to the following.

| | |
|---|---|
| Liquid dispersion [Liquid A1] mentioned above of solid plasticizing agent | 100 parts by weight |
| Liquid dispersion [Liquid A2] mentioned above of eutectic agent | 19 parts by weight |

Example 5

Manufacturing of Thermosensitive Adhesive Material

A thermosensitive adhesive material is manufactured in the same manner as in Example 1 except that the volume average particle diameter of the liquid dispersion [Liquid A2] of a eutectic agent is changed to 1.0 μm by adjusting the dispersion condition of the sand mill.

Example 6

Manufacturing of Thermosensitive Adhesive Material

A thermosensitive adhesive material is manufactured in the same manner as in Example 1 except that the volume average particle diameter of the liquid dispersion [Liquid A2] of a eutectic agent is changed to 1.1 μm by adjusting the dispersion condition of the sand mill.

Example 7

Manufacturing of Thermosensitive Adhesive Material

A thermosensitive adhesive material is manufactured in the same manner as in Example 1 except that the volume average particle diameter of the liquid dispersion [Liquid A2] of a eutectic agent is changed to 2 μm by adjusting the dispersion condition of the sand mill.

Example 8

Manufacturing of Thermosensitive Adhesive Material

A thermosensitive adhesive material is manufactured in the same manner as in Example 1 except that the volume average particle diameter of the liquid dispersion [Liquid A2] of a eutectic agent is changed to 0.3 μm by adjusting the dispersion condition of the sand mill.

Example 9

Manufacturing of Thermosensitive Adhesive Material

A thermosensitive adhesive material is manufactured in the same manner as in Example 1 except that the volume average particle diameter of the liquid dispersion [Liquid A2] of a eutectic agent is changed to 2.1 μm by adjusting the dispersion condition of the sand mill.

Example 10

Manufacturing of Thermosensitive Adhesive Material

A thermosensitive adhesive material is manufactured in the same manner as in Example 1 except that the volume average particle diameter of the liquid dispersion [Liquid A1] of a solid plasticizing agent is changed to 2 μm by adjusting the dispersion condition of the sand mill.

Example 11

Manufacturing of Thermosensitive Adhesive Material

A thermosensitive adhesive material is manufactured in the same manner as in Example 1 except that the volume average particle diameter of the liquid dispersion [Liquid A1] of a solid plasticizing agent is changed to 0.5 μm by adjusting the dispersion condition of the sand mill.

Example 12

A thermosensitive adhesive material is manufactured in the same manner as in Example 1 except that the volume average particle diameter of the liquid dispersion [Liquid A1] of a solid plasticizing agent is changed to 2.1 μm by adjusting the dispersion condition of the sand mill.

Example 13

Manufacturing of Thermosensitive Adhesive Material

A thermosensitive adhesive material is manufactured in the same manner as in Example 1 except that the dispersing agent for the liquid dispersion [Liquid A1] of a solid plasticizing agent and the liquid dispersion [Liquid A2] of a eutectic agent is changed from the copolymer of vinyl alcohol sodium arylsulfate (GOHSELAN L-3266, Nippon Synthetic Chemical Industry Co., Ltd.) to sodium salt of copolymer of vinyl alcohol, vinyl acetate and itaconic acid (K polymer KL-318, weight average molecular weight=80,000, manufactured by Kurary Co., Ltd.).

Example 14

Manufacturing of Thermosensitive Adhesive Material

A thermosensitive adhesive material is manufactured in the same manner as in Example 1 except that 2-(2'-hydroxy-3'-t-butyl-5'-methylphenyl)-5-chlorobenzo triazole functioning as the solid plasticizing agent in the liquid dispersion [Liquid A1] of a solid plasticizing agent is changed to tris(p-t-butoxyphenyl)phosphine represented by the following chemical structure (4).

Chemical structure (4)

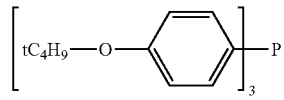

Example 15

Manufacturing and Evaluation of Thermosensitive Adhesive Material Preparation of Liquid of Application [Liquid C] for Forming Non-Expanding Intermediate Layer Liquid of application [Liquid C] for forming a non-expanding intermediate layer is prepared by stirring and dispersing the mixture formed of the following compositions.

Hollow particulate dispersion body (copolymer resin mainly formed of vinylidene chloride-acrylonitrile,

| | |
|---|---|
| solid portion density: 32 weight %, average particle diameter: 3.0 μm, hollow ratio: 92%) | |
| Latex of coplymer of styrene and butadiene (glass transition temperature (Tg) = +4° C. | 10 parts by weight |
| Water | 60 parts by weight |

Preparation of Liquid Dispersion [Liquid D] of Color Fixing Agent

Liquid dispersion [Liquid D] of a color fixing agent is prepared by dispersing the mixture formed of the following compositions using a sand mill such that the volume average particle diameter is 1.5 μm.

| | |
|---|---|
| 3-di-n-butylamino-6-methyl-7-anilinofloran | 20 parts by weight |
| Polyvinylalcohol (10% by weight aqueous solution) | 10 parts by weight |
| Water | 70 parts by weight |

Preparation of Liquid Dispersion [Liquid E] of Coloring Developing Agent

Liquid dispersion [Liquid E] of a coloring developing agent is prepared by dispersing the mixture formed of the following compositions using a sand mill such that the volume average particle diameter is 1.5 μm.

| | |
|---|---|
| 4-isopropoxy-4'-hydroxydiphenylsulfon | 10 parts by weight |
| Polyvinylalcohol (10% by weight aqueous solution) | 25 parts by weight |
| Calcium carbonate | 15 parts by weight |
| Water | 50 parts by weight |

Next, the liquid dispersion [Liquid D] mentioned above of a color fixing agent and the liquid dispersion [Liquid E] of a coloring developing agent are mixed and stirred such that the ratio by volume of [Liquid D]:[Liquid E] is equal to 1:8 to prepare a liquid dispersion [Liquid F] for a thermosensitive recording layer.

Next, the liquid of application [Liquid C] mentioned above for forming a non-expanding intermediate layer is coated and dried on the top side (the side on which a recording layer is provided) of a substrate (base paper having a grammage of 80 g/m$^2$) such that the dry mass is 4 g/m$^2$ to manufacture a non-expanding intermediate layer.

Next, the liquid dispersion [Liquid F] mentioned above for a thermosensitive recording layer is coated on the obtained non-expanding intermediate layer such that the dry mass is 5 g/m$^2$ to manufacture a thermosensitive recording layer.

Next, the following liquid of application for a protective layer is coated on the obtained thermosensitive recording layer such that the dry mass is 3 g/m$^2$. Next, super-calendering treatment is performed such that the smoothness by J.TAPPI-A method is 2,000 seconds. Thus, a thermosensitive recording paper is manufactured.

Preparation of Liquid of Application for Protective Layer

Primary liquid dispersion of a protective layer is prepared by pulverizing and dispersing the mixture formed of the following compositions using a vertical sand mill such that the volume average particle diameter is not greater than 1 μm.

| [Primary Liquid Dispersion of Protective Layer] | |
|---|---|
| Aluminum hydroxide | 20 parts by weight |
| 10% by weight aqueous solution of polyvinyl alcohol (PVA) | 20 parts by weight |
| Water | 40 parts by weight |

Next, a liquid of application for a protective layer formed of the following composition is prepared using the liquid of application mentioned above for a protective layer.

| Composition of Liquid of Application for Protective Layer | |
|---|---|
| Liquid of application for protective layer | 10 parts by weight |
| 10% by weight aqueous solution of polyvinyl alcohol (PVA) | 20 parts by weight |
| 12.5% by weight aqueous solution of epichlorohydrin | 5 parts by weight |
| 30% by weight liquid dispersion of zinc stearate | 2 parts by weight |

Next, a thermosensitive adhesive material is manufactured in the same manner as in Example 1 except that the thermosensitive recording paper mentioned above is used instead of the one-side coated paper.

Example 16

Manufacturing of Thermosensitive Adhesive Material

| | |
|---|---|
| Spherical plastic hollow particles (copolymer of acrylnitrile-vinylidene chloride-methyl methacrylate, solid portion density: 41% by weight, average particle diameter: 3.6 μm, hollow ratio: 90%) | 14.6 parts by weight |
| Emulsion of thermoplastic resin (AP5570, main composition: acrylic acid-2-ethylhexyl resin, solid portion 55% by weight, glass transition temperature (Tg) = −65° C., manufactured by Showa Highpolymer Co., Ltd.) | 21.7 parts by weight |
| Surface active agent (DAPRO W-77, manufactured by Elementis Japan KK) | |
| Water | 63.6 parts by weight |

Next, the liquid of application [Liquid G] for an intermediate layer was coated and dried on the bottom side (the side on which a recording layer was not provided) of one side coated paper having a grammage of 80 g/m$^2$ such that the dry mass was 5 g/m$^2$ to manufacture an intermediate layer. A thermosensitive adhesive material was manufactured in the same manner as in Example 1 except that the thermosensitive adhesive liquid [Liquid B] of application of Example 1 mentioned above was coated and dried on this intermediate layer such that the dry mass was 11 g/m$^2$.

Example 17

A thermosensitive adhesive material is manufactured in the same manner as in Example 1 except for that the adhesiveness imparting agent (E-100, main composition: terpene phenol, solid portion: 50% by weight, softening point: 145° C., manufactured by Arakawa Chemical Industries, Ltd.) is removed from the thermosensitive adhesive liquid of application [Liquid B]

Comparative Example 1

Manufacturing of Thermosensitive Adhesive Material

A thermosensitive adhesive material is manufactured in the same manner as in Example 1 except that the di-p-methyl-benzyl ester of oxalic acid functioning as a eutectic agent in the liquid dispersion [Liquid A] of solid plasticizing agent is changed to 1,4-diacetoxy benzene (D1803, manufactured by Tokyo Chemical Industry Co., Ltd.) represented by the following chemical structure (5).

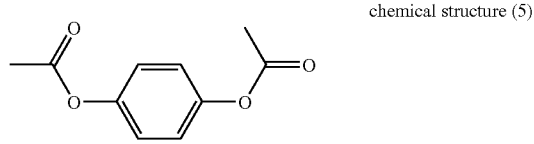

chemical structure (5)

Comparative Example 2

Preparation of Thermosensitive Adhesive Material

A thermosensitive adhesive material is manufactured in the same manner as in Example 1 except that the di-p-methyl-benzyl ester of oxalic acid functioning as a eutectic agent in Example 1 was removed from the liquid dispersion [Liquid A] of a solid plasticizing agent.

Comparative Example 3

Preparation of Thermosensitive Adhesive Material

When a thermosensitive adhesive material is manufactured in the same manner as in Example 1 except that the copolymer of vinyl alcohol sodium arylsulfate functioning as a dispersing agent in Example 1 is removed from the liquid dispersion [Liquid A] of a solid plasticizing agent, the solid plasticizing agent and water are not compatible well with each other so that the liquid of dispersion of a solid plasticizing agent is not manufactured. As a result, a thermosensitive adhesive material is not also manufactured.

Next, with regard to each thermosensitive adhesive material obtained in Examples 1 to 17 and Comparative Examples 1 to 2, the adhesibility and blocking property are evaluated in the following manner using a corrugated board (arithmetical mean surface roughness (Ra)=2.4 μm), a corrugated board (arithmetical mean surface roughness (Ra)=4.7 μm), polyolefin unwoven fabric ("PO unwoven fabric", arithmetical mean surface roughness (Ra)=2.7 μm), and polyolefin wrap ("PO wrap", arithmetical mean surface roughness (Ra)=0.3 μm) as adherends. The results are shown in Table 3, Table 4, Table 5 and Table 6.

Measuring of Adhesibility

Each of the obtained thermosensitive adhesive materials is cut to a size having a width of 4 cm and a length of 10 cm and the surface of the thermosensitive adhesive layer is activated by contacting a thermal head (TH-0976SP, manufactured by TEC) under the conditions of 8 dot/mm, a resistance of 500Ω, with all dots energized, an activation energy of 27.0 mJ/mm$^2$, a printing speed of 100 mm/s and a pressure of 6 kgf/line of a platen roll having a diameter of 1 cm. Next, the thermosensitive adhesive material is attached to the adherends by a rubber roller with an applied pressure of 2 kg in the longitudinal direction. Two minutes and one week after the adhesion, the thermosensitive adhesive material is peeled off under the conditions of a release angle of 180° C. and a releasing speed of 300 mm/min. The adhesibility at the time is measured by a force gauge and the data are read and the averaged values are determined as the adhesibility, which is evaluated according to the rating shown in Table 1. The unit is gf/40 mm. This test is performed under three conditions, which are a low temperature environment (35% RH at 0° C.), room temperature environment (65% RH at 23° C.), and a high temperature environment (65% RH at 40° C.).

The arithmetical mean surface roughness (Ra) on the adhesion surface of the adherend is measured by a surface roughness measuring device (SURFCOM 570A, manufactured by Tokyo Seimitsu Co., Ltd.).

TABLE 1

| Rating | Adhesibility (gf/40 mm) |
|---|---|
| E | Not less than 1,000 |
| G | From 500 to less than 1,000 |
| F | From 100 to less than 500 |
| P | From 50 to less than 100 |
| B | Less than 50 (not adhered) |

Evaluation on Anti-blocking Property

The thermosensitive adhesive layer in each obtained thermosensitive adhesive material and the other side were made to contact with each other and left for 24 hours under the condition of a pressure of 200 g/cm$^2$ at 50° C. Thereafter, both were left at room temperature and then detached and the anti-blocking property at the time was evaluated according to the criteria shown in Table 2. In the present invention, rating 7 or higher is a level suitable for a practical use.

TABLE 2

| Evaluation | Rank | Adhesion | Peeling noise | Dotted transfer | Stripping |
|---|---|---|---|---|---|
| E (Excellent) | 10 | Self weight | | | |
|  | 9 | Slightly | No noise | | |
| G (Good) | 8 | Yes | Slight noise | | |
|  | 7 | | Yes | Partially | |
| F (Fair) | 6 | | | 30 to 50% | |
|  | 5 | | | 50% to all | |
|  | 4 | | | | |
| B (Bad) | 3 | | | | Partially |
|  | 2 | | | | 30 to 50% |
|  | 1 | | | | 50% to all |

TABLE 3

| | | Surface roughness Ra | 2 minutes after adhesion | | | |
|---|---|---|---|---|---|---|
| | Adherend | | 0° C., 35% RH | 5° C., 35% RH | 22° C., 65% RH | 40° C., 65% RH |
| Example 1 | Corrugated board | 2.4 μm | 1249 E | 1450 E | 1269 E | 657 G |

TABLE 3-continued

| | Adherend | Surface roughness Ra | 2 minutes after adhesion | | | | | | | |
|---|---|---|---|---|---|---|---|---|---|---|
| | | | 0° C., 35% RH | | 5° C., 35% RH | | 22° C., 65% RH | | 40° C., 65% RH | |
| | Corrugated board | 4.7 μm | 852 | G | 1055 | E | 1039 | E | 505 | G |
| | PO unwoven fabric | 2.7 μm | 1149 | E | 1349 | E | 1199 | E | 600 | G |
| | PO wrap | 0.3 μm | 2505 | E | 2800 | E | 2955 | E | 715 | G |
| Example 2 | Corrugated board | 2.4 μm | 988 | G | 1151 | E | 1237 | E | 506 | G |
| | Corrugated board | 4.7 μm | 674 | G | 837 | G | 1012 | E | 388 | F |
| | PO unwoven fabric | 2.7 μm | 908 | G | 1071 | E | 1169 | E | 462 | F |
| | PO wrap | 0.3 μm | 2210 | E | 2310 | E | 2323 | E | 615 | G |
| Example 3 | Corrugated board | 2.4 μm | 1345 | E | 1554 | E | 1250 | E | 498 | F |
| | Corrugated board | 4.7 μm | 917 | G | 1131 | E | 1023 | E | 383 | F |
| | PO unwoven fabric | 2.7 μm | 1237 | E | 1446 | E | 1181 | E | 455 | F |
| | PO wrap | 0.3 μm | 2698 | E | 3001 | E | 2911 | E | 542 | G |
| Example 4 | Corrugated board | 2.4 μm | 492 | F | 1155 | E | 1258 | E | 669 | G |
| | Corrugated board | 4.7 μm | 336 | F | 840 | G | 1030 | E | 514 | G |
| | PO unwoven fabric | 2.7 μm | 453 | F | 1075 | E | 1189 | E | 611 | G |
| | PO wrap | 0.3 μm | 987 | G | 2230 | E | 2929 | E | 728 | G |
| Example 5 | Corrugated board | 2.4 μm | 494 | F | 1194 | E | 1220 | E | 557 | G |
| | Corrugated board | 4.7 μm | 337 | F | 869 | G | 999 | G | 428 | F |
| | PO unwoven fabric | 2.7 μm | 454 | F | 1111 | E | 1153 | E | 509 | G |
| | PO wrap | 0.3 μm | 991 | G | 2306 | E | 2841 | E | 606 | G |
| Example 6 | Corrugated board | 2.4 μm | 480 | F | 1122 | E | 1205 | E | 550 | G |
| | Corrugated board | 4.7 μm | 327 | F | 816 | G | 987 | G | 423 | F |
| | PO unwoven fabric | 2.7 μm | 442 | F | 1044 | E | 1139 | E | 502 | G |
| | PO wrap | 0.3 μm | 963 | G | 2167 | E | 2806 | E | 599 | G |
| Example 7 | Corrugated board | 2.4 μm | 474 | F | 832 | C | 1199 | E | 560 | G |
| | Corrugated board | 4.7 μm | 323 | F | 605 | G | 982 | G | 430 | F |
| | PO unwoven fabric | 2.7 μm | 436 | F | 774 | G | 1133 | E | 511 | G |
| | PO wrap | 0.3 μm | 951 | G | 1607 | E | 2792 | E | 610 | G |
| Example 8 | Corrugated board | 2.4 μm | 1300 | E | 1500 | E | 1230 | E | 602 | G |
| | Corrugated board | 4.7 μm | 887 | G | 1091 | E | 1007 | E | 463 | F |
| | PO unwoven fabric | 2.7 μm | 1196 | E | 1396 | E | 1162 | E | 550 | G |
| | PO wrap | 0.3 μm | 2607 | E | 2897 | E | 2864 | E | 655 | G |
| Example 9 | Corrugated board | 2.4 μm | 749 | G | 1160 | E | 1142 | E | 788 | G |
| | Corrugated board | 4.7 μm | 511 | G | 844 | G | 935 | G | 606 | G |
| | PO unwoven fabric | 2.7 μm | 689 | G | 1079 | E | 1079 | E | 720 | G |
| | PO wrap | 0.3 μm | 1503 | E | 2240 | E | 2660 | E | 858 | G |

TABLE 4

| | Adherend | Surface roughness Ra | 2 minutes after adhesion | | | | | | | |
|---|---|---|---|---|---|---|---|---|---|---|
| | | | 0° C., 35% RH | | 5° C., 35% RH | | 22° C., 65% RH | | 40° C., 65% RH | |
| Example 10 | Corrugated board | 2.4 μm | 1036 | E | 1250 | E | 1161 | E | 608 | G |

TABLE 4-continued

|  | Adherend | Surface roughness Ra | 2 minutes after adhesion | | | | | | | |
|---|---|---|---|---|---|---|---|---|---|---|
|  |  |  | 0° C., 35% RH | | 5° C., 35% RH | | 22° C., 65% RH | | 40° C., 65% RH | |
|  | Corrugated board | 4.7 μm | 707 | G | 909 | G | 951 | G | 467 | F |
|  | PO unwoven fabric | 2.7 μm | 953 | G | 1163 | E | 1097 | E | 555 | G |
|  | PO wrap | 0.3 μm | 2078 | E | 2414 | E | 2704 | E | 662 | G |
| Example 11 | Corrugated board | 2.4 μm | 1254 | E | 1545 | E | 1369 | E | 688 | G |
|  | Corrugated board | 4.7 μm | 855 | G | 1124 | E | 1121 | E | 529 | G |
|  | PO unwoven fabric | 2.7 μm | 1154 | E | 1437 | E | 1293 | E | 628 | G |
|  | PO wrap | 0.3 μm | 2515 | E | 2983 | E | 3188 | E | 749 | G |
| Example 12 | Corrugated board | 2.4 μm | 1187 | E | 1305 | E | 1015 | E | 591 | G |
|  | Corrugated board | 4.7 μm | 809 | G | 950 | G | 831 | G | 455 | F |
|  | PO unwoven fabric | 2.7 μm | 1092 | E | 1214 | E | 959 | G | 540 | G |
|  | PO wrap | 0.3 μm | 2380 | E | 2520 | E | 2364 | E | 644 | G |
| Example 13 | Corrugated board | 2.4 μm | 442 | F | 1005 | E | 1254 | E | 450 | F |
|  | Corrugated board | 4.7 μm | 302 | F | 731 | G | 1027 | E | 346 | F |
|  | PO unwoven fabric | 2.7 μm | 407 | F | 935 | G | 1185 | E | 411 | F |
|  | PO wrap | 0.3 μm | 886 | G | 1941 | E | 2920 | E | 490 | F |
| Example 14 | Corrugated board | 2.4 μm | 1654 | E | 1307 | E | 1355 | E | 605 | G |
|  | Corrugated board | 4.7 μm | 1128 | E | 951 | G | 1109 | E | 465 | F |
|  | PO unwoven fabric | 2.7 μm | 1522 | E | 1216 | E | 1280 | E | 553 | G |
|  | PO wrap | 0.3 μm | 3317 | E | 2524 | E | 3155 | E | 659 | G |
| Example 15 | Corrugated board | 2.4 μm | 1245 | E | 1444 | E | 1267 | E | 650 | G |
|  | Corrugated board | 4.7 μm | 849 | G | 1051 | E | 1037 | E | 500 | G |
|  | PO unwoven fabric | 2.7 μm | 1145 | E | 1343 | E | 1197 | E | 594 | G |
|  | PO wrap | 0.3 μm | 2497 | E | 2788 | E | 2950 | E | 708 | G |
| Example 16 | Corrugated board | 2.4 μm | 2317 | E | 2234 | E | 2200 | E | 750 | G |
|  | Corrugated board | 4.7 μm | 1581 | E | 1625 | E | 1801 | E | 576 | G |
|  | PO unwoven fabric | 2.7 μm | 2131 | E | 2078 | E | 2079 | E | 685 | G |
|  | PO wrap | 0.3 μm | 3647 | E | 3314 | E | 3123 | E | 816 | G |
| Example 17 | Corrugated board | 2.4 μm | 833 | G | 967 | G | 846 | G | 438 | F |
|  | Corrugated board | 4.7 μm | 568 | G | 703 | G | 693 | G | 337 | F |
|  | PO unwoven fabric | 2.7 μm | 766 | G | 899 | G | 799 | G | 400 | F |
|  | PO wrap | 0.3 μm | 1670 | E | 1867 | E | 1970 | E | 477 | F |
| Comparative Example 1 | Corrugated board | 2.4 μm | 220 | F | 455 | F | 987 | G | 495 | F |
|  | Corrugated board | 4.7 μm | 150 | F | 331 | F | 808 | G | 380 | F |
|  | PO unwoven fabric | 2.7 μm | 202 | F | 423 | F | 932 | G | 452 | F |
|  | PO wrap | 0.3 μm | 1703 | E | 1803 | E | 2009 | E | 595 | G |
| Comparative Example 2 | Corrugated board | 2.4 μm | 0 | B | 19 | B | 1963 | E | 1199 | E |
|  | Corrugated board | 4.7 μm | 0 | B | 14 | B | 1607 | E | 922 | G |
|  | PO unwoven fabric | 2.7 μm | 0 | B | 18 | B | 1855 | E | 1095 | E |
|  | PO wrap | 0.3 μm | 0 | B | 37 | B | 3571 | E | 1305 | E |

TABLE 5

|  | Adherend | Surface roughness Ra | 1 week after adhesion | | | | | | | | Blocking rating | |
|---|---|---|---|---|---|---|---|---|---|---|---|---|
|  |  |  | 0° C., 35% RH | | 5° C., 35% RH | | 22° C., 65% RH | | 40° C., 65% RH | | | |
| Example 1 | Corrugated board | 2.4 μm | 1230 | E | 1428 | E | 1219 | E | 659 | G | 10 | E |
|  | Corrugated board | 4.7 μm | 841 | G | 1021 | E | 1033 | E | 501 | G | | |
|  | PO unwoven fabric | 2.7 μm | 1144 | E | 1341 | E | 1184 | E | 589 | G | | |
|  | PO wrap | 0.3 μm | 2450 | E | 2754 | E | 2948 | E | 705 | G | | |
| Example 2 | Corrugated board | 2.4 μm | 945 | G | 1111 | E | 1214 | E | 510 | G | 9 | E |
|  | Corrugated board | 4.7 μm | 646 | G | 794 | G | 1029 | E | 388 | F | | |
|  | PO unwoven fabric | 2.7 μm | 879 | G | 1043 | G | 1179 | E | 456 | F | | |
|  | PO wrap | 0.3 μm | 2188 | E | 2289 | E | 2221 | E | 601 | G | | |
| Example 3 | Corrugated board | 2.4 μm | 1307 | E | 1511 | E | 1044 | E | 448 | F | 10 | E |
|  | Corrugated board | 4.7 μm | 894 | G | 1080 | E | 885 | E | 341 | F | | |
|  | PO unwoven fabric | 2.7 μm | 1216 | E | 1419 | E | 1014 | E | 400 | F | | |
|  | PO wrap | 0.3 μm | 2603 | E | 2914 | E | 2525 | E | 479 | F | | |
| Example 4 | Corrugated board | 2.4 μm | 488 | F | 1140 | E | 1234 | E | 655 | G | 8 | G |
|  | Corrugated board | 4.7 μm | 334 | F | 815 | G | 1046 | E | 498 | F | | |
|  | PO unwoven fabric | 2.7 μm | 454 | F | 1071 | E | 1199 | E | 585 | G | | |
|  | PO wrap | 0.3 μm | 972 | G | 2199 | E | 2984 | E | 701 | G | | |
| Example 5 | Corrugated board | 2.4 μm | 487 | F | 1178 | E | 1210 | E | 554 | G | 9 | E |
|  | Corrugated board | 4.7 μm | 333 | F | 842 | G | 1025 | E | 421 | F | | |
|  | PO unwoven fabric | 2.7 μm | 453 | F | 1106 | E | 1175 | E | 495 | F | | |
|  | PO wrap | 0.3 μm | 970 | G | 2272 | E | 2926 | E | 593 | G | | |
| Example 6 | Corrugated board | 2.4 μm | 414 | F | 1113 | E | 1199 | E | 545 | G | 9 | E |
|  | Corrugated board | 4.7 μm | 283 | F | 796 | G | 1016 | G | 414 | F | | |
|  | PO unwoven fabric | 2.7 μm | 385 | F | 1045 | E | 1165 | E | 487 | F | | |
|  | PO wrap | 0.3 μm | 825 | G | 2147 | E | 2900 | E | 583 | G | | |
| Example 7 | Corrugated board | 2.4 μm | 400 | F | 805 | G | 1154 | E | 552 | G | 7 | G |
|  | Corrugated board | 4.7 μm | 273 | F | 576 | G | 978 | G | 420 | F | | |
|  | PO unwoven fabric | 2.7 μm | 372 | F | 756 | G | 1121 | E | 493 | F | | |
|  | PO wrap | 0.3 μm | 797 | G | 1553 | E | 2791 | E | 591 | G | | |
| Example 8 | Corrugated board | 2.4 μm | 1296 | E | 1489 | E | 1222 | E | 576 | G | 10 | E |
|  | Corrugated board | 4.7 μm | 886 | G | 1065 | E | 1036 | E | 438 | F | | |
|  | PO unwoven fabric | 2.7 μm | 1205 | E | 1398 | E | 1187 | E | 515 | G | | |
|  | PO wrap | 0.3 μm | 2581 | E | 2872 | E | 2955 | E | 616 | G | | |
| Example 9 | Corrugated board | 2.4 μm | 738 | G | 1142 | E | 1097 | E | 725 | G | 10 | E |
|  | Corrugated board | 4.7 μm | 505 | G | 817 | G | 930 | G | 551 | G | | |
|  | PO unwoven fabric | 2.7 μm | 686 | G | 1073 | E | 1066 | E | 648 | G | | |
|  | PO wrap | 0.3 μm | 1470 | G | 2203 | E | 2653 | E | 776 | G | | |

TABLE 6

| | Adherend | Surface roughness Ra | 1 week after adhesion | | | | | | | | Blocking rating | |
|---|---|---|---|---|---|---|---|---|---|---|---|---|
| | | | 0° C., 35% RH | | 5° C., 35% RH | | 22° C., 65% RH | | 40° C., 65% RH | | | |
| Example 10 | Corrugated board | 2.4 μm | 1005 | E | 1202 | E | 1068 | E | 570 | G | 8 | G |
| | Corrugated board | 4.7 μm | 687 | G | 859 | G | 905 | G | 433 | F | | |
| | PO unwoven fabric | 2.7 μm | 935 | G | 1129 | E | 1037 | E | 509 | G | | |
| | PO wrap | 0.3 μm | 2002 | E | 2318 | E | 2583 | E | 610 | G | | |
| Example 11 | Corrugated board | 2.4 μm | 1238 | E | 1542 | E | 1364 | E | 666 | G | 10 | E |
| | Corrugated board | 4.7 μm | 846 | G | 1103 | E | 1156 | E | 206 | F | | |
| | PO unwoven fabric | 2.7 μm | 1151 | E | 1448 | E | 1325 | E | 595 | G | | |
| | PO wrap | 0.3 μm | 2466 | E | 2974 | E | 3299 | E | 712 | G | | |
| Example 12 | Corrugated board | 2.4 μm | 1169 | E | 1285 | E | 975 | G | 527 | G | 8 | G |
| | Corrugated board | 4.7 μm | 799 | G | 919 | G | 826 | G | 401 | F | | |
| | PO unwoven fabric | 2.7 μm | 1087 | E | 1207 | E | 947 | G | 471 | F | | |
| | PO wrap | 0.3 μm | 2328 | E | 2479 | E | 2358 | E | 564 | G | | |
| Example 13 | Corrugated board | 2.4 μm | 432 | F | 1001 | E | 1255 | E | 445 | F | 10 | E |
| | Corrugated board | 4.7 μm | 295 | F | 716 | G | 1064 | E | 338 | F | | |
| | PO unwoven fabric | 2.7 μm | 402 | F | 940 | G | 1219 | E | 398 | F | | |
| | PO wrap | 0.3 μm | 860 | G | 1931 | E | 3035 | E | 476 | F | | |
| Example 14 | Corrugated board | 2.4 μm | 1648 | E | 1288 | E | 1246 | E | 599 | G | 10 | E |
| | Corrugated board | 4.7 μm | 1127 | E | 921 | G | 1056 | E | 455 | F | | |
| | PO unwoven fabric | 2.7 μm | 1533 | E | 1210 | E | 1210 | E | 535 | G | | |
| | PO wrap | 0.3 μm | 3283 | E | 2484 | E | 3013 | E | 641 | G | | |
| Example 15 | Corrugated board | 2.4 μm | 1243 | E | 1420 | E | 1233 | E | 638 | G | 9 | E |
| | Corrugated board | 4.7 μm | 850 | G | 1015 | E | 1045 | E | 485 | F | | |
| | PO unwoven fabric | 2.7 μm | 1156 | E | 1333 | E | 1198 | E | 570 | G | | |
| | PO wrap | 0.3 μm | 2476 | E | 2739 | E | 2982 | E | 683 | G | | |
| Example 16 | Corrugated board | 2.4 μm | 2311 | E | 2218 | E | 2153 | E | 742 | G | 9 | E |
| | Corrugated board | 4.7 μm | 1580 | E | 1586 | E | 1824 | E | 564 | G | | |
| | PO unwoven fabric | 2.7 μm | 2149 | E | 2083 | E | 2091 | E | 663 | G | | |
| | PO wrap | 0.3 μm | 2603 | E | 2278 | E | 2207 | E | 794 | G | | |
| Example 17 | Corrugated board | 2.4 μm | 820 | G | 952 | G | 813 | G | 439 | F | 8 | G |
| | Corrugated board | 4.7 μm | 561 | G | 681 | G | 689 | G | 334 | F | | |
| | PO unwoven fabric | 2.7 μm | 763 | G | 894 | G | 789 | G | 393 | F | | |
| | PO wrap | 0.3 μm | 1633 | E | 1836 | E | 1965 | E | 470 | F | | |
| Comparative Example 1 | Corrugated board | 2.4 μm | 170 | F | 425 | F | 978 | G | 457 | F | 8 | G |
| | Corrugated board | 4.7 μm | 116 | F | 304 | F | 829 | G | 347 | F | | |
| | PO unwoven fabric | 2.7 μm | 158 | F | 399 | F | 950 | G | 408 | F | | |
| | PO wrap | 0.3 μm | 1701 | E | 1759 | E | 2005 | E | 585 | G | | |
| Comparative Example 2 | Corrugated board | 2.4 μm | 0 | B | 0 | B | 1850 | E | 1005 | E | 8 | G |
| | Corrugated board | 4.7 μm | 0 | B | 0 | B | 1568 | E | 764 | G | | |
| | PO unwoven fabric | 2.7 μm | 0 | B | 0 | B | 1797 | E | 898 | G | | |
| | PO wrap | 0.3 μm | 0 | B | 0 | B | 2474 | E | 1075 | E | | |

Judging from the results seen in Table 3, Table 4, Table 5 and Table 6, it is recognized that the thermosensitive adhesive materials of Examples 1 to 17 have sufficient adhesibility to a rough surface adherend, for example, a corrugated board, in an environment of from a low temperature (0° C.) to room temperature (25° C.), that is, an adhesibility by which the thermosensitive adhesive material is not detached for an extended period of time, and anti-blocking property when compared with those of Comparative Examples 1 to 2.

According to the present invention, various kinds of problems in the background art can be solved and it is possible to provide a thermosensitive adhesive composition which has a sufficient adhesibility to a rough surface adherend, for example, a corrugated board, in an environment of from a low temperature (0° C.) to room temperature (25° C.), and has both an adhesibility by which peeling-off can be prevented for an extended period of time and an anti-blocking property and a method of manufacturing the thermosensitive adhesive composition and a thermosensitive adhesive material.

This document claims priority and contains subject matter related to Japanese Patent Application No. 2005-333095, filed on Nov. 17, 2005, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A thermosensitive adhesive composition comprising:
   (a) a thermosensitive plastic resin;
   (b) as a dispersing agent, a polyvinyl alcohol resin having a sulphonic acid group;
   (c) a solid plasticizing agent; and
   (d) a eutectic agent represented by the following chemical structure (1):

Chemical structure (1)

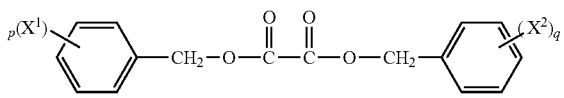

wherein $X^1$ and $X^2$ independently represent any one of a hydrogen atom, a halogen atom and an alkyl group, p and q independently represent an integer of from 1 to 5.

2. The thermosensitive adhesive composition according to claim 1, wherein the eutectic agent represented by the chemical structure (1) is a dibenzyl ester of oxalic acid represented by the following chemical structure (1-1):

Chemical structure (1-1)

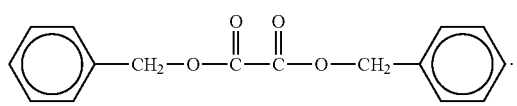

3. The thermosensitive adhesive composition according to claim 1, wherein the eutectic agent represented by the chemical structure (1) is a di-p-methylbenzyl ester of oxalic acid represented by the following chemical structure (1-2):

Chemical structure (1-2)

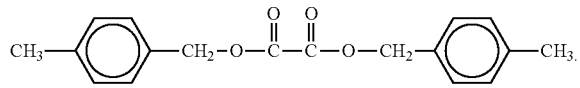

4. The thermosensitive adhesive composition according to claim 1, wherein a content of the eutectic agent is from 20 to 40 parts by weight based on 100 parts by weight of the solid plasticizing agent.

5. The thermosensitive adhesive composition according to claim 1, wherein a volume average particle diameter of the eutectic agent is not greater than 2.0 μm.

6. The thermosensitive adhesive composition according to claim 1, wherein the solid plasticizing agent is at least one compound selected from the group consisting of benzotriazole compounds and triphenylphosphine compounds.

7. The thermosensitive adhesive composition according to claim 1, wherein a volume average particle diameter of the solid plasticizing agent is not greater than 2.0 μm.

8. The thermosensitive adhesive composition according to claim 1, further comprising an adhesive imparting agent.

9. A thermosensitive adhesive material comprising: a substrate; and
a thermosensitive adhesive layer provided on a side of the substrate, comprising the thermosensitive adhesive composition of claim 1.

10. The thermosensitive adhesive material according to claim 9, wherein an adhesibility of the thermosensitive adhesive layer to an adhesion surface of an adherend is not less than 400 gf/40 mm when measured two minutes after adhesion at an environment temperature of from 0 to 40° C.

11. The thermosensitive adhesive material according to claim 10, wherein an arithmetical mean surface roughness (Ra) of the adhesion surface of the adherend is not less than 0.3 μm.

12. The thermosensitive adhesive material according to claim 9, wherein an adhesibility of the thermosensitive adhesive layer to an adhesion surface of an adherend is not less than 400 gf/40 mm when measured one week after adhesion at an environment temperature of from 0 to 40° C.

13. The thermosensitive adhesive material according to claim 9, further comprising an intermediate layer between the substrate and the thermosensitive adhesive layer, comprising hollow particles and a binder resin.

14. The thermosensitive adhesive material according to claim 9, wherein the substrate has opposed sides, and further comprising a recording layer which is provided on a side of the substrate opposite to the side on which the thermosensitive adhesive layer is provided.

15. The thermosensitive adhesive material according to claim 14, wherein the recording layer is one of a thermosensitive recording layer, an ink jet recording layer, an ink receptive layer for thermal transfer and an electrophotographic recording layer.

16. The thermosensitive adhesive material according to claim 15, wherein the thermosensitive recording layer comprises a leuco dye and a coloring developing agent.

17. The thermosensitive adhesive material according to claim 9, having a form of one of a label, a sheet and a roll.

18. A structure comprising
(a) the thermosensitive adhesive material of claim 9 and
(b) an adherend having an adhesion surface to which the thermosensitive adhesive material is adhered by the thermosensitive adhesive layer.

19. The thermosensitive adhesive composition according to claim 1, having a total solid portion of which the thermosensitive plastic resin is between 10 and 60 wt % and the solid plasticizing agent is between 25 and 80 wt %, and which optionally also includes an adhesiveness imparting agent present in a proportion between 1 and 30 wt %; wherein the dispersing agent is present in a proportion of between 2 and 10 parts by weight per 100 parts by weight of the solid plasticizing agent; and wherein the eutectic agent is present in a proportion of between 20 and 40 parts by weight per 100 parts by weight of the solid plasticizing agent.

* * * * *